(12) United States Patent
Tsugimura et al.

(10) Patent No.: US 11,093,194 B2
(45) Date of Patent: Aug. 17, 2021

(54) PRINTING APPARATUS AND MODULE

(71) Applicant: BROTHER KOGYO KABUSHIKI KAISHA, Nagoya (JP)

(72) Inventors: Koichi Tsugimura, Nagoya (JP); Wataru Hasegawa, Konan (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 16/796,316

(22) Filed: Feb. 20, 2020

(65) Prior Publication Data

US 2020/0272396 A1    Aug. 27, 2020

(30) Foreign Application Priority Data

Feb. 22, 2019 (JP) .............................. JP2019-030422

(51) Int. Cl.
| | |
|---|---|
| *G06K 15/00* | (2006.01) |
| *G06F 3/12* | (2006.01) |
| *G06K 15/02* | (2006.01) |
| *G06K 15/10* | (2006.01) |

(52) U.S. Cl.
CPC ............ *G06F 3/1297* (2013.01); *G06F 3/124* (2013.01); *G06K 15/102* (2013.01); *G06K 15/1857* (2013.01)

(58) Field of Classification Search
CPC ..... G06F 3/1297; G06F 3/124; G06K 15/102; G06K 15/1857
See application file for complete search history.

(56) References Cited

U.S. PATENT DOCUMENTS

| | | | |
|---|---|---|---|
| 6,778,291 B1* | 8/2004 | Clouthier ................ | H04N 19/12 358/1.15 |
| 2007/0109586 A1* | 5/2007 | Yamada ............. | H04N 1/00233 358/1.14 |
| 2008/0101706 A1* | 5/2008 | Maeda ..................... | H04N 1/41 382/232 |
| 2013/0308156 A1* | 11/2013 | Kakutani ........... | H04N 1/00204 358/1.14 |
| 2017/0223210 A1 | 8/2017 | Yamada | |
| 2019/0263162 A1* | 8/2019 | Wakabayashi ......... | B41J 15/165 |

FOREIGN PATENT DOCUMENTS

JP             2017-134718 A        8/2017

* cited by examiner

*Primary Examiner* — Moustapha Diaby
(74) *Attorney, Agent, or Firm* — Merchant & Gould P.C.

(57) ABSTRACT

In a printing apparatus, a controller is configured to: receive compressed image data; store the compressed image data into a memory; individually identify partial compressed data in the stored compressed image data, the partial compressed data corresponding to separate images; store the partial compressed data into the memory or store information identifying each of the partial compressed data, into the memory; a first creating processing for decompressing one of the partial compressed data and creating print data based on partial decompressed data obtained by decompressing the one partial compressed data; and a first output processing for outputting the created print data. The controller repeats the first creating processing and the first output processing a number of times corresponding to the number of the partial compressed data. The printing apparatus performs printing based on the print data output in the first output processing.

18 Claims, 9 Drawing Sheets

PRINTING APPARATUS AND MODULE

CROSS REFERENCE TO RELATED APPLICATION

The present application claims priority from Japanese Patent Application No. 2019-030422, which was filed on Feb. 22, 2019, the disclosure of which is herein incorporated by reference in its entirety.

BACKGROUND

The following disclosure relates to a printing apparatus and a module configured to decompress compressed image data to perform printing.

There is known a printer that receives print data described in, e.g., a page description language (PDL), from a printer driver installed in a terminal device such as a personal computer and performs printing on a sheet based on the received print data.

The printer driver installed in the terminal device such as the personal computer uses a random-access memory (RAM) of a memory of the terminal device to convert image data for printing to print data in a form in which the printer can perform printing, and output the obtained print data.

Printers configured to perform printing by receiving image data from a terminal device not via a printer driver are desired recently. That is, printers capable of receiving image data from the terminal device and performing printing by converting the received image data to print data have been desired.

Since RAMs used for converting data are expensive, however, the capacity of the RAM of the memory provided in the printer is generally less than that of the RAM of the memory of the terminal device such as a personal computer. The small capacity of the RAM makes it unable to convert image data to print data in the case where the data amount of the image data for one page is large. For example, in the case where the resolution of the image data is high, the amount of the image data for one page is large.

Accordingly, an aspect of the disclosure relates to a printing apparatus and a module enabling printing for input image data.

In one aspect of the disclosure, a printing apparatus includes: a memory; and a controller configured to execute: a receiving processing in which the controller receives compressed image data as compressed data; a first storing processing in which the controller stores the compressed image data into the memory; an identifying processing in which the controller individually identifies a plurality of partial compressed data in the compressed image data stored in the memory, the plurality of partial compressed data corresponding respectively to a plurality of separate images obtained by dividing an image corresponding to one page; a second storing processing in which the controller stores each of the plurality of partial compressed data into the memory or stores information identifying each of the plurality of partial compressed data, into the memory; a first creating processing in which the controller decompresses one partial compressed data of the plurality of partial compressed data and creates print data based on partial decompressed data obtained by decompressing the one partial compressed data; and a first output processing in which the controller outputs the created print data. The controller is configured to repeat the first creating processing and the first output processing a number of times corresponding to the number of the plurality of partial compressed data. The printing apparatus is configured to perform printing based on the print data output in the first output processing.

Another aspect of the disclosure relates to a module provided in a controller of a printing apparatus including a memory and the controller. The controller is configured to execute: a receiving processing in which the controller receives compressed image data as compressed data; a first storing processing in which the controller stores the compressed image data into the memory; an identifying processing in which the controller individually identifies a plurality of partial compressed data in the compressed image data stored in the memory, the plurality of partial compressed data corresponding respectively to a plurality of separate images obtained by dividing an image corresponding to one page; a second storing processing in which the controller stores each of the plurality of partial compressed data into the memory or stores information identifying each of the plurality of partial compressed data, into the memory; a creating processing in which the controller decompresses one partial compressed data of the plurality of partial compressed data and creates print data based on partial decompressed data obtained by decompressing the one partial compressed data; and an output processing in which the controller outputs the created print data. The controller is configured to repeat the creating processing and the output processing a number of times corresponding to the number of the plurality of partial compressed data, and execute the identifying processing.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which:

FIG. 5 is a view illustrating processings to be executed by a job-management module and so on;

EMBODIMENT

Hereinafter, there will be described one embodiment by reference to the drawings. It is to be understood that the following embodiment is described only by way of example, and the disclosure may be otherwise embodied with various modifications without departing from the scope and spirit of the disclosure. For example, the order of processings which will be described below may be changed without departing from the scope and spirit of the disclosure.

Figure 1A:
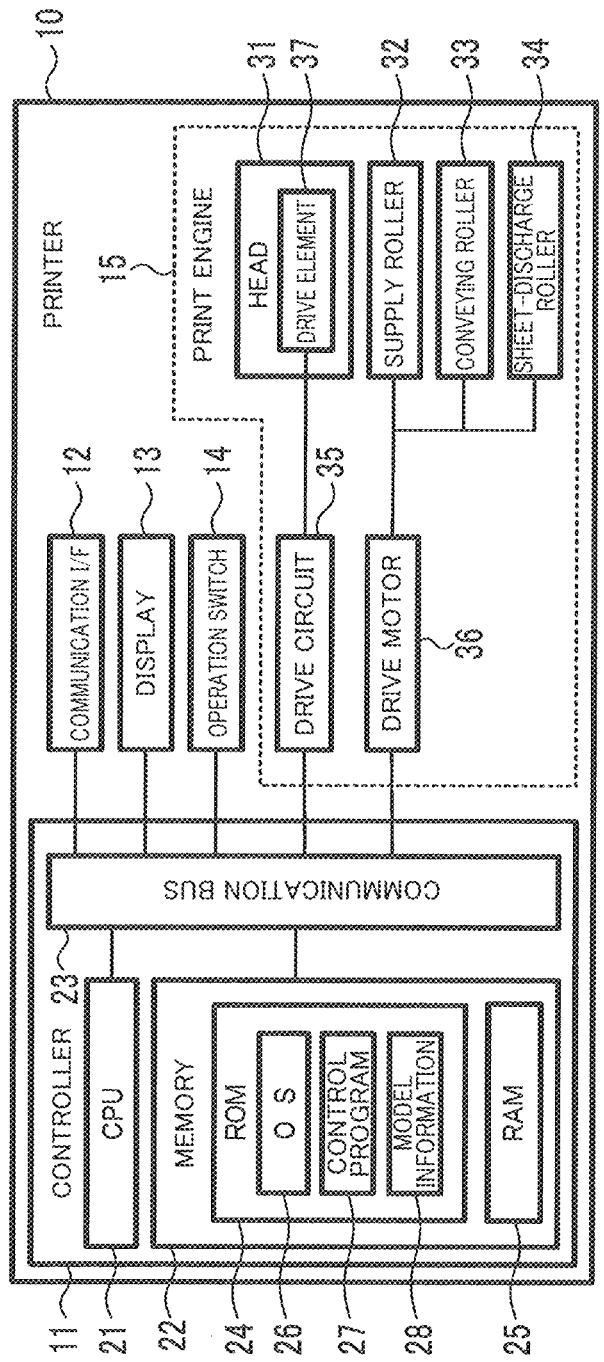
FIG. 1A is a view of a configuration of a printer.

There will be described a printer 10 according to the present embodiment with reference to FIGS. 1A and 1B. The printer 10 is capable of performing printing by receiving print data created by a printer driver installed in an information processing device such as a personal computer and capable of performing printing by receiving compressed image data. That is, the printer 10 is capable of receiving a print instruction not only from the information processing device installed with the printer driver but also from an information processing device not installed with the printer driver.

The printer 10 may be any of (i) an ink-jet printer configured to perform printing on a sheet by ejecting ink droplets onto the sheet, (ii) a laser printer configured to perform printing by pressing toner attached to a drum, against the sheet, and (iii) a thermal printer configured to perform printing on a sheet with film ink. That is, the printer 10 may perform printing on the sheet in any method. In the present embodiment, the printer 10 is the inkjet printer.

The printer 10 includes a controller 11, a communication interface 12, a display 13, an operation switch 14, and a print engine 15.

The communication interface 12 is connected to a communication network, not illustrated. The communication network is connected to the information processing device. That is, the communication interface 12 is connected to the information processing device over the communication network. Examples of the communication network include a universal-serial-bus (USB) cable, a wired local-area network (LAN), a wireless LAN, a wide area network (WAN), and the Internet. That is, the communication network may be of any type of the communication network as long as the compressed image data is transmittable from the information processing device to the printer 10. It is noted that the printer 10 need not be connected to the communication network as long as a portable storage medium such as a USB memory is mountable on the printer 10, and the compressed image data is inputtable to the printer 10.

The display 13 includes: a display panel configured to display characters and figures; and a transparent film-like touch sensor superposed on the display panel. That is, the display 13 is what is called a touch screen. It is noted that the display 13 may include only the display panel.

The operation switch 14 is configured to receive operational inputs of a user. It is noted that the printer 10 may include only one of the operation switch 14 and the touch sensor of the display 13. Each of the operation switch 14 and the touch sensor of the display 13 is one example of a user interface.

The print engine 15 includes a sheet-supply tray, a head 31, a supply roller 32, a conveying roller 33, a sheet-discharge roller 34, a sheet-output tray, a drive circuit 35, and a drive motor 36. The drive motor 36 drives and rotates the supply roller 32, the conveying roller 33, and the sheet-discharge roller 34. The sheet placed on the sheet-supply tray is supplied from the sheet-supply tray by the supply roller 32 being rotated and is then conveyed by the conveying roller 33 being rotated. While the sheet is being conveyed by the conveying roller 33, the head 31 ejects ink droplets to print an image on the sheet. That is, the print engine 15 conveys the sheet, performs printing on the conveyed sheet, and discharges the printed sheet to the sheet-output tray.

The head 31 includes drive elements 37 each configured to eject ink droplets. The drive element 37 is a piezoelectric element or a heater, for example. When a direct-current voltage is applied to the piezoelectric element, the piezoelectric element is deformed to eject the ink droplet. When a direct-current voltage is applied to the heater, the heater heats ink to cause bumping of the ink to eject the ink droplet.

The drive circuit 35 is configured to drive the drive elements 37. The drive circuit 35 selectively applies the direct-current voltage to one or ones of the drive elements 37 at the timing and a voltage value related to input print data. The print data is input to the drive circuit 35 by the controller 11.

The controller 11 includes: a central processing unit (CPU) 21; a memory 22 configured to store programs, information, and data; and a communication bus 23. The CPU 21 is one example of a computer.

The controller 11, for example, is constituted by a pattern circuit board and electronic components mounted on the pattern circuit board, such as microcomputers, various integrated circuits (ICs), capacitors, and diodes.

The CPU 21 and the memory 22 are connected to the communication bus 23. The CPU 21 executes an operating system (OS) 26 and a control program 27, which will be described below, stored in the memory 22. The OS 26 and the control program 27 executable by the CPU 21 read data and information from the memory 22 or write data and information into the memory 22. These operations will be described later in detail.

The communication bus 23 is connected to the communication interface 12, the display 13, the operation switch 14, and the drive motor 36 and the drive circuit 35 of the print engine 15. That is, the CPU 21 that executes the OS 26 and the control program 27 which will be described below is capable of: receiving information and data from the information processing device via the communication interface 12; displaying characters and images on the display 13; receiving user's instruction via the touch sensor of the display 13 and/or the operation switch 14; and inputting information and data to the drive motor 36 and the drive circuit 35 of the print engine 15.

The memory 22 includes a read-only memory (ROM) 24 and a random-access memory (RAM) 25. In addition to the ROM 24 and the RAM 25, the memory 22 may include an electrically erasable programmable ROM (EEPROM), a hard disk drive (HDD), a portable storage medium such as a USB memory, and a buffer of the CPU 21.

The memory 22 may be a storage medium readable by the computer. The storage medium readable by the computer is a non-transitory medium. In addition to the above-described examples, examples of the non-transitory medium include storage media such as a CD-ROM and a DVD-ROM. The non-transitory medium is also a tangible medium. An electric signal that transfers a program downloaded from, e.g., a server on the Internet is a signal medium readable by the computer as one kind of the medium readable by the computer but is not included in the non-transitory storage medium readable by the computer.

The ROM 24 stores the OS 26 and the control program 27.

The ROM 24 stores model information 28 indicating the specifications of the printer 10. The model information 28, for example, includes: the model name of the printer 10; information indicating the sizes of sheets usable for printing of the printer 10; information indicating that the printer 10 is capable of performing color printing; information indicating that the printer 10 is capable of performing duplex printing; and information indicating the orientation of the sheet to be conveyed. In the case where a sheet of the A4 size is conveyed, examples of the information indicating the orientation of the sheet to be conveyed include: information indicating sheet supply in a state in which the longitudinal direction of the sheet coincides with the conveying direction; and information indicating sheet supply in a state in which the widthwise direction of the sheet coincides with the conveying direction. The model information 28 is stored in the ROM 24 as management-information-base (MIB) information, for example. It is noted that the model information 28 may be stored in the EEPROM.

Figure 7:
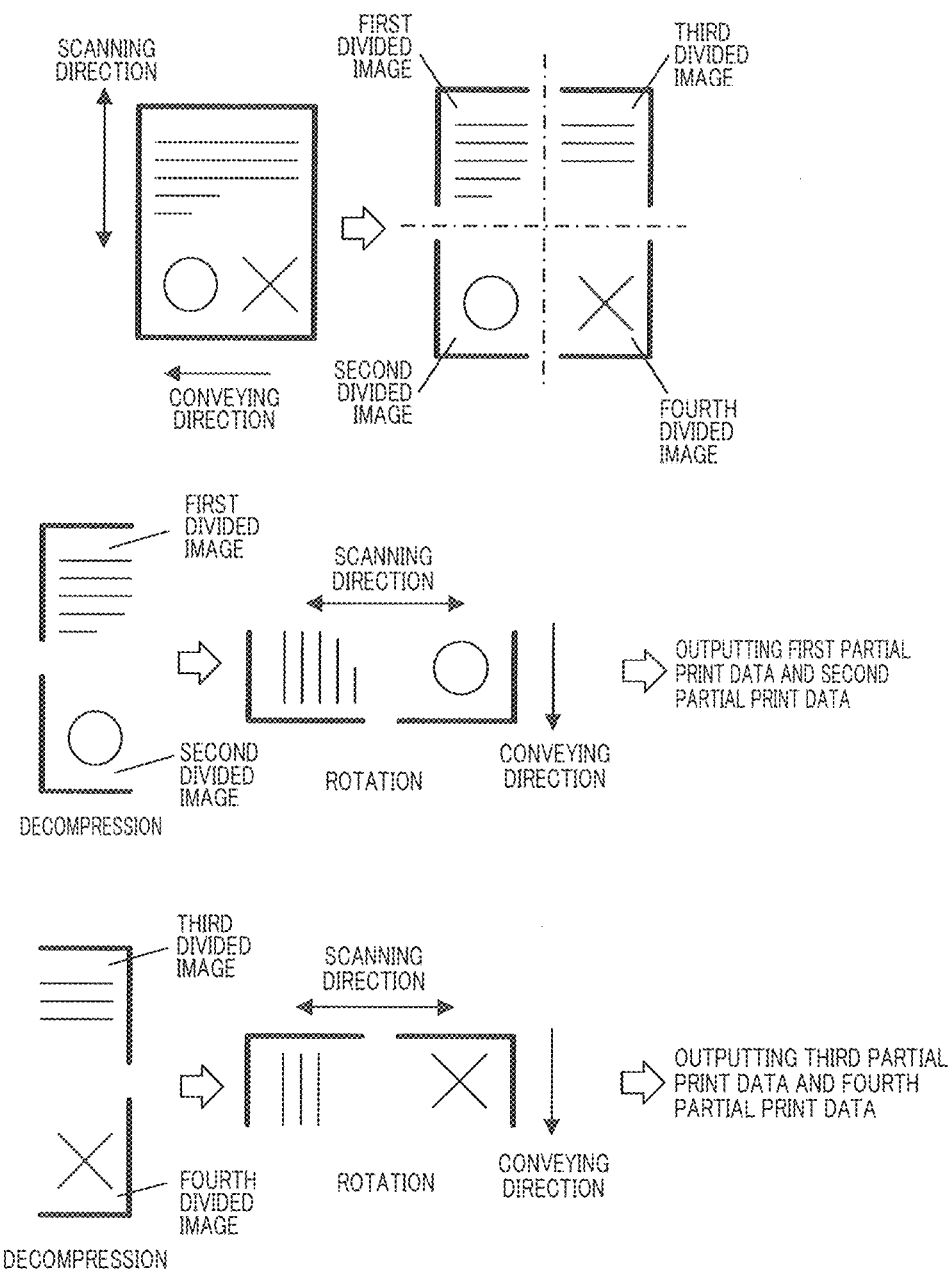
FIG. 7 is a view for explaining partial compressed data.
Figure 8:
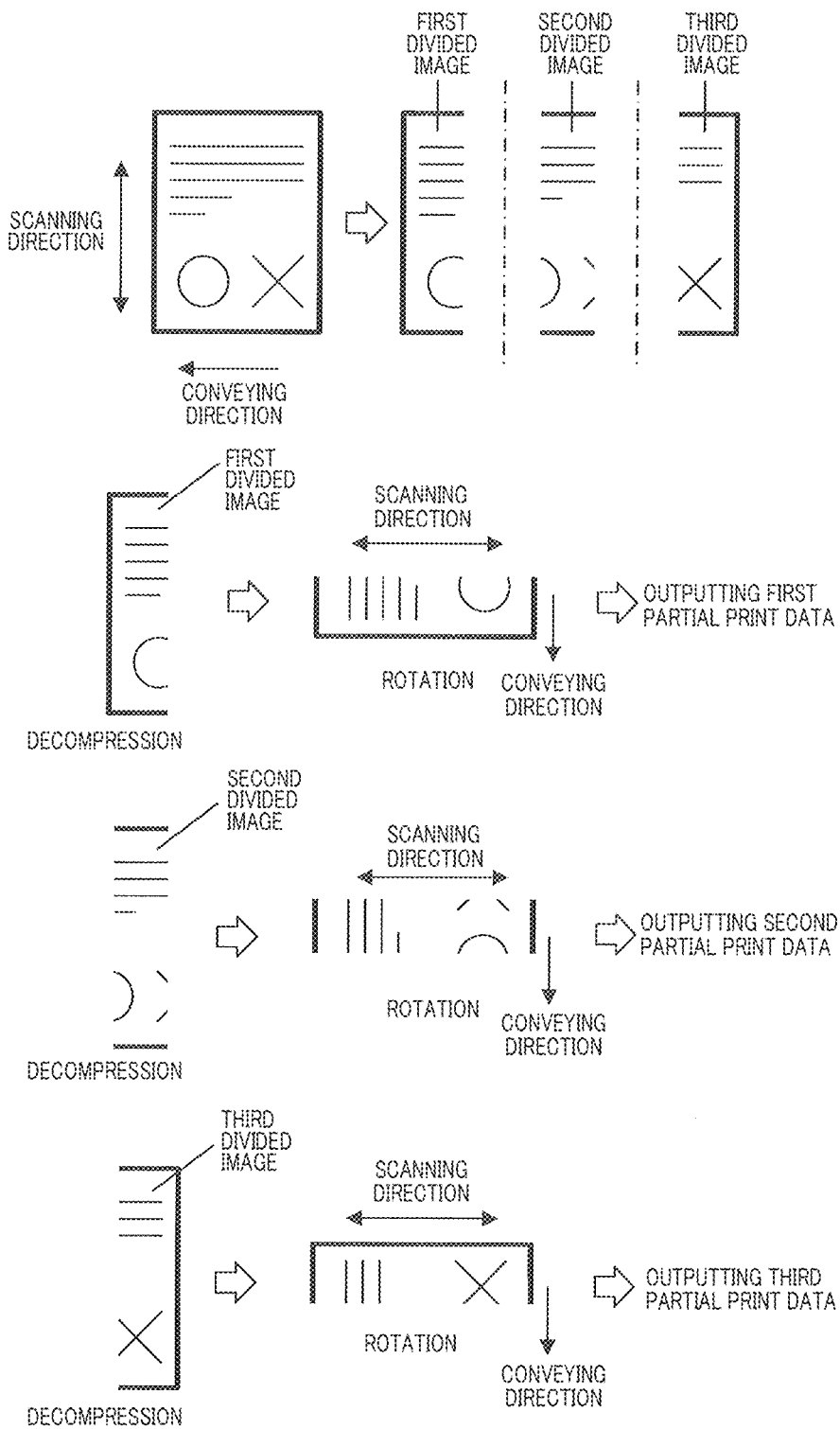
FIG. 8 is a view for explaining partial compressed data obtained by dividing other dividing positions.

The ROM 24 stores dividing information. Examples of the dividing information include: information indicating division of an image to be printed into four portions as illustrated in FIG. 7; and information indicating division of an image to be printed into three portions as illustrated in FIG. 8. The dividing information will be described later in detail.

The RAM 25 is to be used for execution of the OS 26 and the control program 27 and for execution of processings for creating the print data based on the compressed image data. These operations will be described later in detail.

The control program 27 is for receiving the compressed image data, converting the received compressed image data to the print data, outputting the print data to the drive circuit 35 and the drive motor 36, and causing the print engine 15 to perform printing.

Figure 1B:
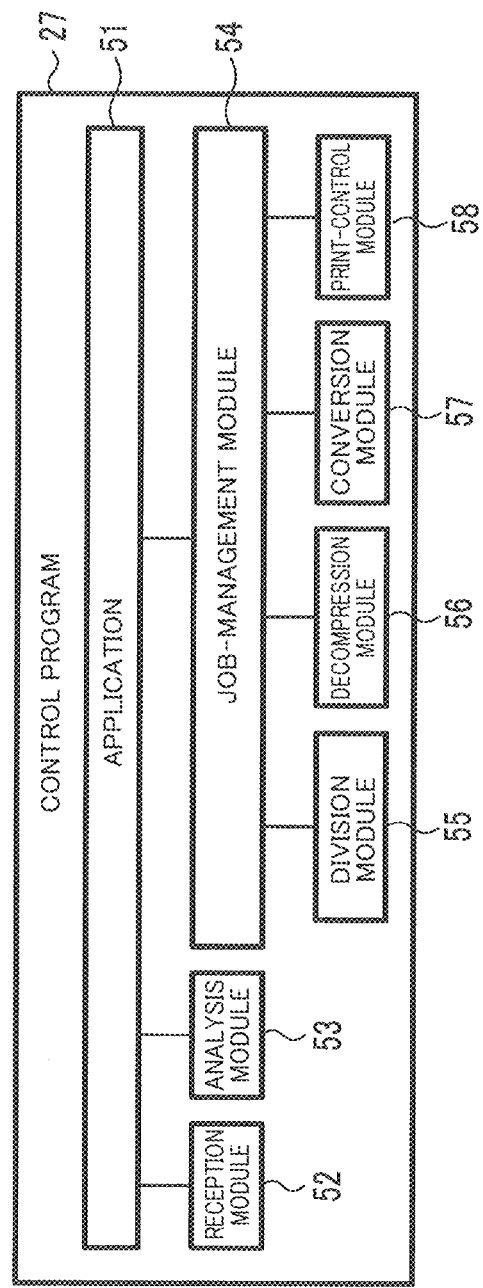
FIG. 1B is a view of a configuration of a control program.

As illustrated in FIG. 1B, the control program 27 includes a plurality of modules and an application 51 that is a protocol layer higher than the plurality of modules. The modules include a reception module 52, an analysis module 53, and a job-management module 54. Modules lower than the job-management module 54 include a division module 55, a decompression module 56, a conversion module 57, and a print-control module 58. In the following description, the reception module 52, the analysis module 53, the job-management module 54, the division module 55, the decompression module 56, the conversion module 57, and the print-control module 58 may be referred to as "the reception module 52 and so on". The division module 55, the decompression module 56, the conversion module 57, and the print-control module 58 may be referred to as "the division module 55 and so on".

The application 51 and the reception module 52 and so on are executed in pseudo-parallel. That is, the application 51 and the reception module 52 and so on are executed as multitasking processings.

The reception module 52 executes a receiving processing for receiving the compressed image data that is data obtained by compressing image data. The reception module 52 receives the compressed image data from the information processing device via the communication interface 12 or receives the compressed image data input from, e.g., the USB memory mounted on the printer 10. The reception module 52 stores the received compressed image data into a specific storage area of the RAM 25 which is designated by the application 51.

The analysis module 53 analyzes the compressed image data stored in the memory 22 by the reception module 52 to perform print-job registration. When the compressed image data is received by the reception module 52, the analysis module 53 registers the print job with the job-management module 54 which will be described below. The analysis module 53 executes an analysis process (FIG. 3) for finding a dividing position or positions in the compressed image data without decompressing the compressed image data.

This operation will be described later in detail. The analysis module 53 is one example of a module.

The job-management module 54 causes the lower division module 55 and so on to execute processings which will be described below to execute a processing for inputting the print data to the drive circuit 35 and the drive motor 36 of the print engine 15. That is, the job-management module 54 manages and processes the registered print job.

The division module 55 creates partial compressed data based on the compressed image data. The partial compressed data is obtained by dividing the compressed image data. Specifically, it is considered that image data obtained by decompressing the compressed image data cannot be processed due to the capacity of the RAM 25 of the memory 22, depending upon the resolution of the image. The division module 55 creates a plurality of partial compressed data obtained by dividing the compressed image data, without the decompression module 56, which will be described below, decompressing all the compressed image data.

This operation will be specifically described with reference to FIG. 7. Each of the partial compressed data represents a corresponding one of separate images obtained by dividing an image of one page represented by the compressed image data, into two, three, or four portions, for example. In the example illustrated in FIG. 7, the image represented by the compressed image data is divided into four separate image, i.e., a first separate image, a second separate image, a third separate image, and a fourth separate image. The first separate image is represented by first partial compressed data as the partial compressed data. The second separate image is represented by second partial compressed data as the partial compressed data. The third separate image is represented by third partial compressed data as the partial compressed data. The fourth separate image is represented by fourth partial compressed data as the partial compressed data. The compressed image data is divided by the division module 55 into four partial compressed data, i.e., the first partial compressed data, the second partial compressed data, the third partial compressed data, and the fourth partial compressed data.

The decompression module 56 creates partial decompressed data by decompressing the partial compressed data created by the division module 55.

The conversion module 57 converts the partial decompressed data created by the decompression module 56 to the print data. Examples of the conversion include rotation conversion, color conversion, error diffusion, and quinary conversion.

The rotation conversion is conversion of rotating the separate image represented by the partial decompressed data, by a rotation angle, such as 90 degrees, 180 degrees, 270 degrees, and −90 degrees. For example, in the case where the model information 28 indicates sheet supply in a state in which the widthwise direction of the sheet coincides with the conveying direction, the conversion module 57 executes rotation conversion of rotating the separate image represented by the partial decompressed data by the rotation angle of 90 degrees.

The color conversion is a processing of converting RGB (red, green, blue) color data containing the decompressed page data, to, e.g., BMCY color data based on which the print engine 15 can perform printing. BMCY represents black, magenta, cyan, and yellow.

The error diffusion is one of binary-conversion techniques and is conversion to be executed for improving the image quality.

The quinary conversion is conversion for determining, from the decompressed page data, a drive signal related to the voltage value of the direct-current voltage to be applied to the drive element 37. Examples of the voltage value include "small", "medium", "large", "extra-large", and "zero".

The print-control module 58 outputs the print data to the drive circuit 35 and the drive motor 36 to cause the print engine 15 to perform printing.

There will be next described, with reference to FIGS. 2-9, processings in which the control program 27 creates the print data from the compressed image data and outputs the created print data. It is noted that the reception module 52, the analysis module 53, and the job-management module 54 execute processings described below in response to receiving instructions from the application 51.

In the present specification, there will be principally described processings to be executed by the CPU 21 according to commands described in the control program 27. That is, the processings such as determination (judgement), extraction, selection, calculation, determination, identification, obtainment, reception, control, and setting in the following description represent the processings to be executed by the CPU 21. The processings to be executed by the CPU 21 include control of hardware via a controller such as the OS 26. It is noted that obtainment is to be used as a concept not requiring a request. That is, the processing in which the CPU 21 receives data without a request is included in the concept that the CPU 21 obtains data. In the present specification, data is represented by a bit string readable by the computer. Data substantially identical in meaning but different in format are treated as the same data. Information is treated in the same manner. The processings such as instruction, response, and requirement are to be executed by communication of information indicating instruction, response, and requirement, for example. The terms such as instruction, response, and requirement may be described in meaning of information itself indicating instruction, response, and requirement, for example.

The processings to be executed by the CPU 21 according to the commands described in the control program 27 may be simply described. For example, the expression "the CPU 21 executes a processing according to the control program 27" may be hereinafter referred to as "the CPU 21 executes a processing", "the controller 11 executes a processing", or "the control program 27 executes a processing".

In the present specification, the processing in which the CPU 21 determines whether information A indicates that a condition B is satisfied may be conceptually referred to as "the processing in which the CPU 21 determines based on the information A whether the condition B is satisfied". Also, the processing in which the CPU 21 determines whether information A indicates that the condition B is satisfied or a condition C is satisfied may be conceptually referred to as "the processing in which the CPU 21 determines based on the information A whether the condition B is satisfied or the condition C is satisfied".

In the present specification, each of data and information is represented by a bit or a bit string that can be treated by the computer. The computer can treat data without consideration of meaning indicated by each bit. In contrast, operations of the computer change depending upon meaning indicated by each bit in information. Instruction is a control signal for prompting a destination device to perform the next operation. Instruction may contain information and may have a property of information.

Moreover, data is treated as the same data as long as the data is recognized to represent the same meaning, even in the case where the form (e.g., the text format, the binary format, and the flag format) of the data varies with computer. This applies to information. For example, information representing "two" may be kept as information in the text format "0x32" in the ASCII code in some computer and kept as information in the binary format "10" in the binary expression in another computer.

It should be understood that the above-described distinction between data and information is not strict, and an exceptional treatment is allowed. For example, data may be temporarily treated as information, and information may be temporarily treated as data. Data treated in some device may be treated as information in another device. Information may be taken out from data, and data may be taken out from information.

The term "when" or "in response to" in the present specification indicates that a processing described after the character string is to be executed, in the case where the condition described before the character string is satisfied. It is noted that the timing of execution of the processing at least needs to be a timing after the condition is satisfied and need not be a timing just after the condition is satisfied.

Figure 2:
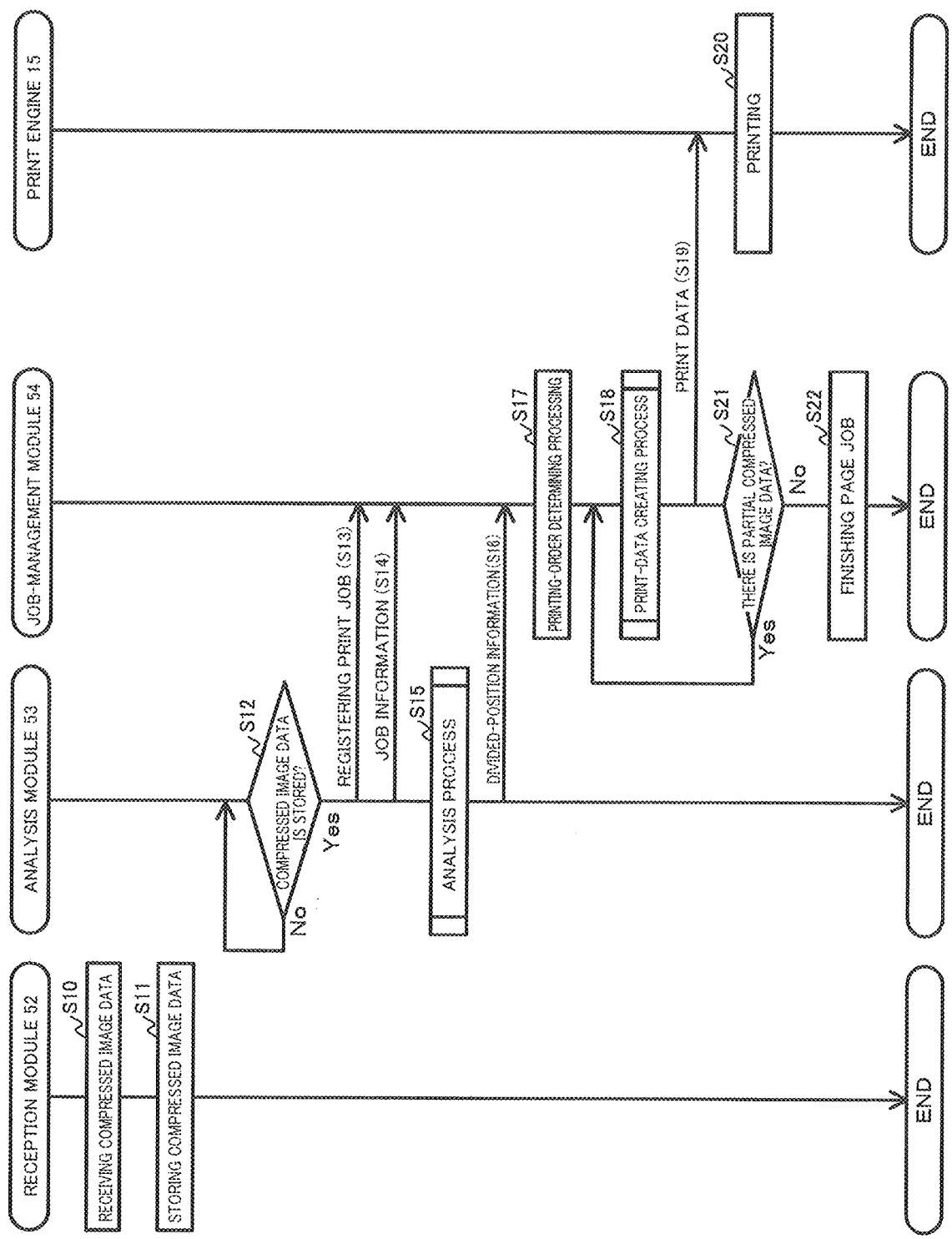
FIG. 2 is a view for explaining processings according to the control program for receiving compressed image data and causing a print engine to perform printing.

As illustrated in FIG. 2, the reception module 52 at S10 receives, from the information processing device, an input of the compressed image data (FIG. 9A) containing document information, page header information, and compressed data. The processing at S10 is one example of the receiving processing.

The document information, the page header information, and the compressed data are a set of data. The document information is a command for determining the type of data, for example. The page header information contains print settings and a resolution. Examples of the print settings include: information indicating the size of the sheet such as the A4 size and the A5 size; information indicating the type of the sheet such as a plain paper and a glossy paper; information indicating a printing side such as simplex printing and duplex printing; and information indicating a printing color such as black and white printing and color printing. The resolution is information representing the number of pixels of the page in the height direction and the number of pixels of the page in the width direction. For example, the resolution is 400 (width)×400 (height) or 600 (width)×600 (height).

As illustrated in FIG. 2, the reception module 52 at S11 stores the received compressed image data into the RAM 25 of the memory 22. The processing at S11 is one example of a first storing processing.

The analysis module 53 at S12 determines whether the compressed image data is stored in the RAM 25. The analysis module 53, for example, monitors a predetermined area of the RAM 25 stored in the compressed image data (S12: No) to determine whether the compressed image data is stored in the RAM 25.

When the analysis module 53 determines that the compressed image data is stored in the RAM 25 (S12: Yes), the analysis module 53 at S13 registers a print job with the job-management module 54. The analysis module 53 reads and obtains the document information contained in the compressed image data. The analysis module 53 at S14 notifies the job-management module 54 of job information containing the print settings contained in the obtained document information.

The analysis module 53 at S15 executes the analysis process for obtaining information about the page contained in the compressed image data (hereinafter referred to as "page information"). The page information is required to register the page job with the job-management module 54. The analysis process at S15 is one example of an identifying processing. The analysis process will be described below with reference to FIG. 3.

Figure 6:
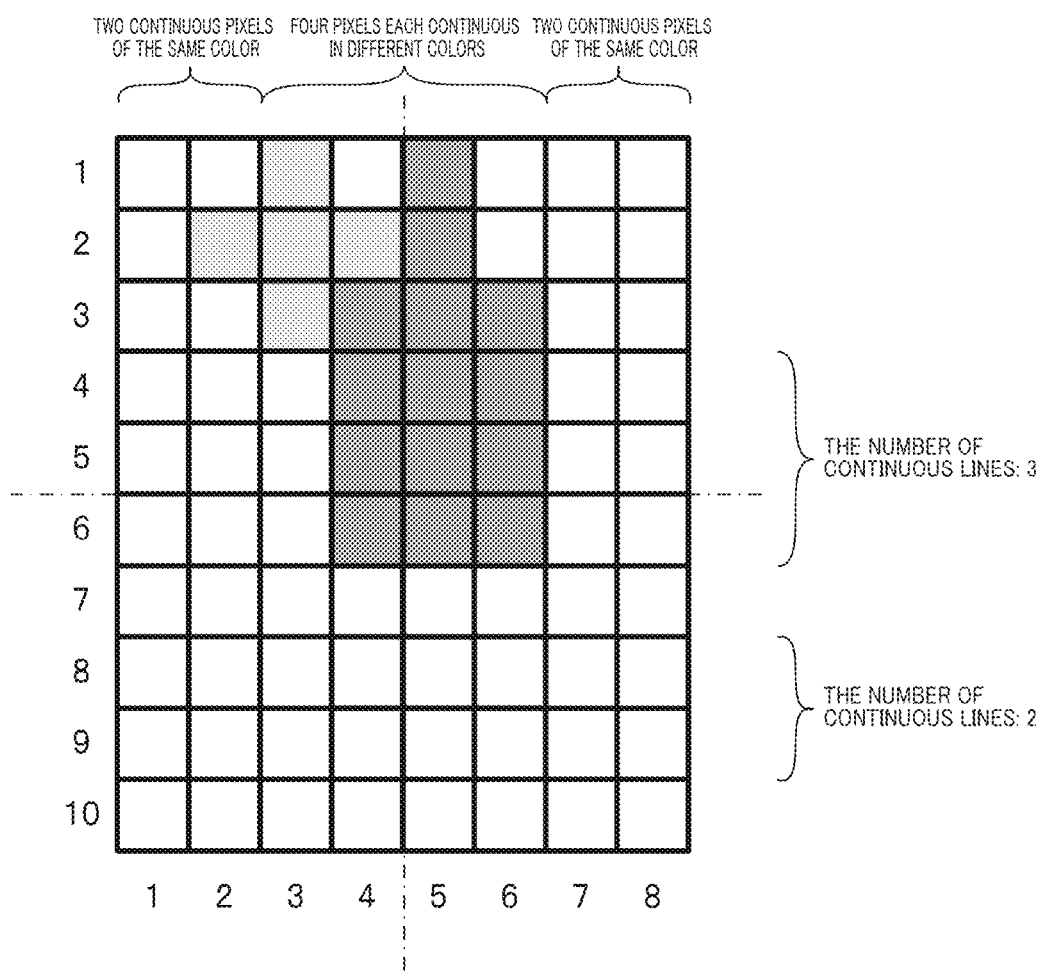
FIG. 6 is a view of pixels in an image.

In the following description, the analysis process will be described, taking, as an example, a case where the dividing information stored in the memory 22 indicates four-portion division, and the image illustrated in FIG. 6 is to be divided into four portions by the straight one-dot chain lines. The resolution of the image is 8 (width)×10 (height). That is, the number of pixels in the width direction is "8", and the number of pixels in the height direction is "10". Ten rows each constituted by eight pixels arranged in the width direction are arranged in the height direction. The rows may be hereinafter referred to respectively as "first row", "second row", "third row", "fourth row", "fifth row", "sixth row", "seventh row", "eighth row", "ninth row", and "tenth row" in the order from the upper side.

In the following description, there will be described a case where the image data is compressed image data which is compressed in the PackBits format. It is noted that the processings at S31 and S32 indicated by the broken lines in FIG. 3 will be described later in description for a second modification.

Figure 3:
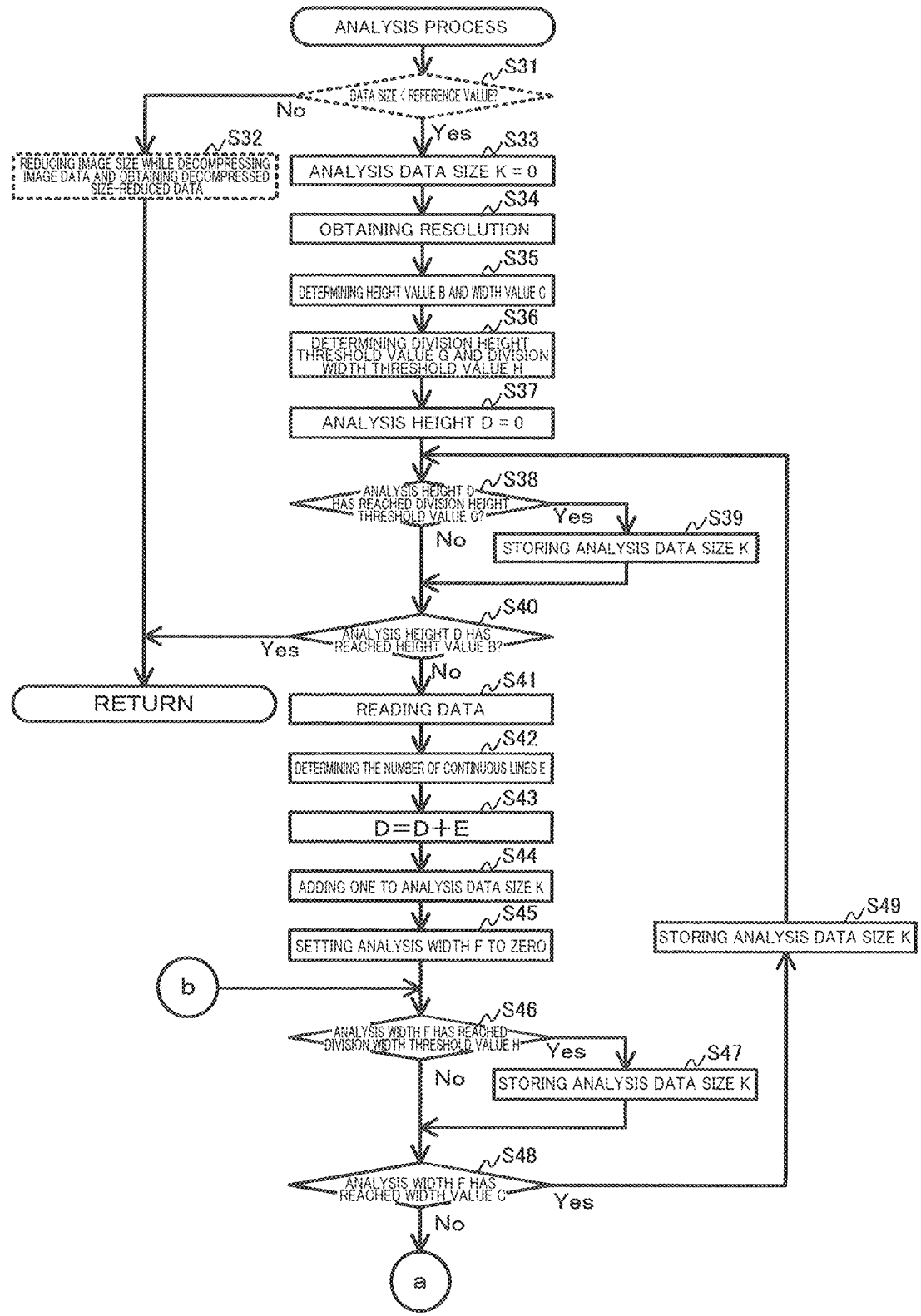
FIG. 3 is a flowchart representing a portion of an analysis process.

As illustrated in FIG. 3, the analysis module 53 at S33 sets an analysis data size K to an initial value. The analysis data size K indicates the number of unit data for which an analysis is completed after reading of the unit data. The unit data is data of one byte, for example.

The analysis module 53 at S34 obtains the resolution contained in the document information. The analysis module 53 at S35 determines a height value B and a width value C based on the obtained resolution. The height value B indicates the number of pixels in the height direction which is indicated by the resolution. The width value C indicates the number of pixels in the width direction which is indicated by the resolution. In the example illustrated in FIG. 6, the height value B is ten, and the width value C is eight.

The analysis module 53 at S36 determines a division height threshold value G based on the height value B and the number of divisions in the height direction and determines a division width threshold value H based on the width value C and the number of divisions in the width direction. As illustrated in FIG. 6, in the case where the image represented by the compressed image data is divided in the height direction and the width direction into four portions, the number of divisions in the height direction is two, and the number of divisions in the width direction is two. The analysis module 53 sets the division height threshold value G to five obtained by dividing the height value B by two (B/2=5) and sets the division width threshold value H to four obtained by dividing the width value C by two (C/2=4). The number of divisions is stored in the memory 22 in advance as the dividing information. It is noted that, in the case where the image is divided in only the height direction or the width direction, the analysis module 53 determines only the division height threshold value G or only the division width threshold value H.

The analysis module 53 at S37 sets an analysis height D to zero as an initial value. The analysis height D indicates the number of pixels in the height direction which indicates the total number of pixels indicating the analysis data size K for which the analysis is completed. That is, the analysis height D indicates the number of rows for which the analysis is completed for the pixel in the page. The total number of pixels indicating the analysis data size K for which the analysis is completed is one example of a pixel count value.

The analysis module 53 at S38 determines whether the analysis height D has reached five as the division height threshold value G. When the analysis module 53 determines that the analysis height D has reached five as the division height threshold value G (S38: Yes), the analysis module 53 at S39 stores the analysis data size K indicating the number of the read unit data, into the memory 22. That is, the analysis module 53 at S39 stores, into the memory 22, the analysis data size K identifying the unit data indicating the dividing position in the height direction. The unit data indicating the dividing position in the height direction is one example of dividing-position unit data.

When the analysis module 53 determines that the analysis height D has not reached or had reached five as the division height threshold value G (S38: No), the analysis module 53 skips the processing at S39 and determines at S40 whether the analysis height D has reached the height value B. That is, the analysis module 53 at S40 determines whether the analysis of the image is completed.

When the analysis module 53 determines that the analysis height D has reached the height value B (S40: Yes), the analysis module 53 determines that the analysis of the image is completed, and the analysis process ends. When the analysis module 53 determines that the analysis height D has not reached the height value B (S40: No), the analysis module 53 at S41 newly reads unit data having not been analyzed yet. The analysis module 53 at S42 determines the number of continuous lines E based on the read unit data. In the example illustrated in FIG. 6, the fourth to sixth rows are the same as each other in the content of the pixels, and the eighth and ninth rows are the same as each other in the content of the pixels. The analysis module 53 determines the numbers of continuous lines E=1, E=2, and E=3.

The analysis module 53 at S43 adds the determined number of lines E to the analysis height D. For example, in the case where the number of continuous lines E is equal to three, "3" is added to the analysis height D. When the unit data is read, the analysis module 53 at S44 adds "1" to the analysis data size K.

The analysis module 53 at S45 sets an analysis width F to zero as an initial value. The analysis width F represents the number of pixels in the width direction which is indicated by the unit data being analyzed. The analysis module 53 at S46 determines whether the analysis width F has reached four as the division width threshold value H.

When the analysis module 53 determines that the analysis width F has reached four as the division width threshold value H (S46: Yes), the analysis module 53 at S47 stores the analysis data size K into the memory 22. That is, the analysis module 53 at S47 stores, into the memory 22, the analysis data size K identifying the unit data indicating the dividing position in the width direction. The unit data indicating the dividing position in the width direction is another example of the dividing-position unit data.

When the analysis module 53 determines that the analysis width F has reached or had reached four as the division width threshold value H (S46: No), the analysis module 53 skips the processing at S47 and determines at S48 whether the analysis width F has reached the width value C. That is, the analysis module 53 at S48 determines whether the analysis of the image is completed to its right end.

When the analysis module 53 determines that the analysis width F has reached the width value C (S48: Yes), the analysis module 53 at S49 stores the analysis data size K into the memory 22 and executes the processings at S38 and subsequent steps again. That is, the analysis module 53 at S49 stores, into the memory 22, the analysis data size K identifying the unit data indicating the dividing position in the width direction. The unit data indicating the dividing position in the width direction is another example of the dividing-position unit data.

Figures 4A, 4B:
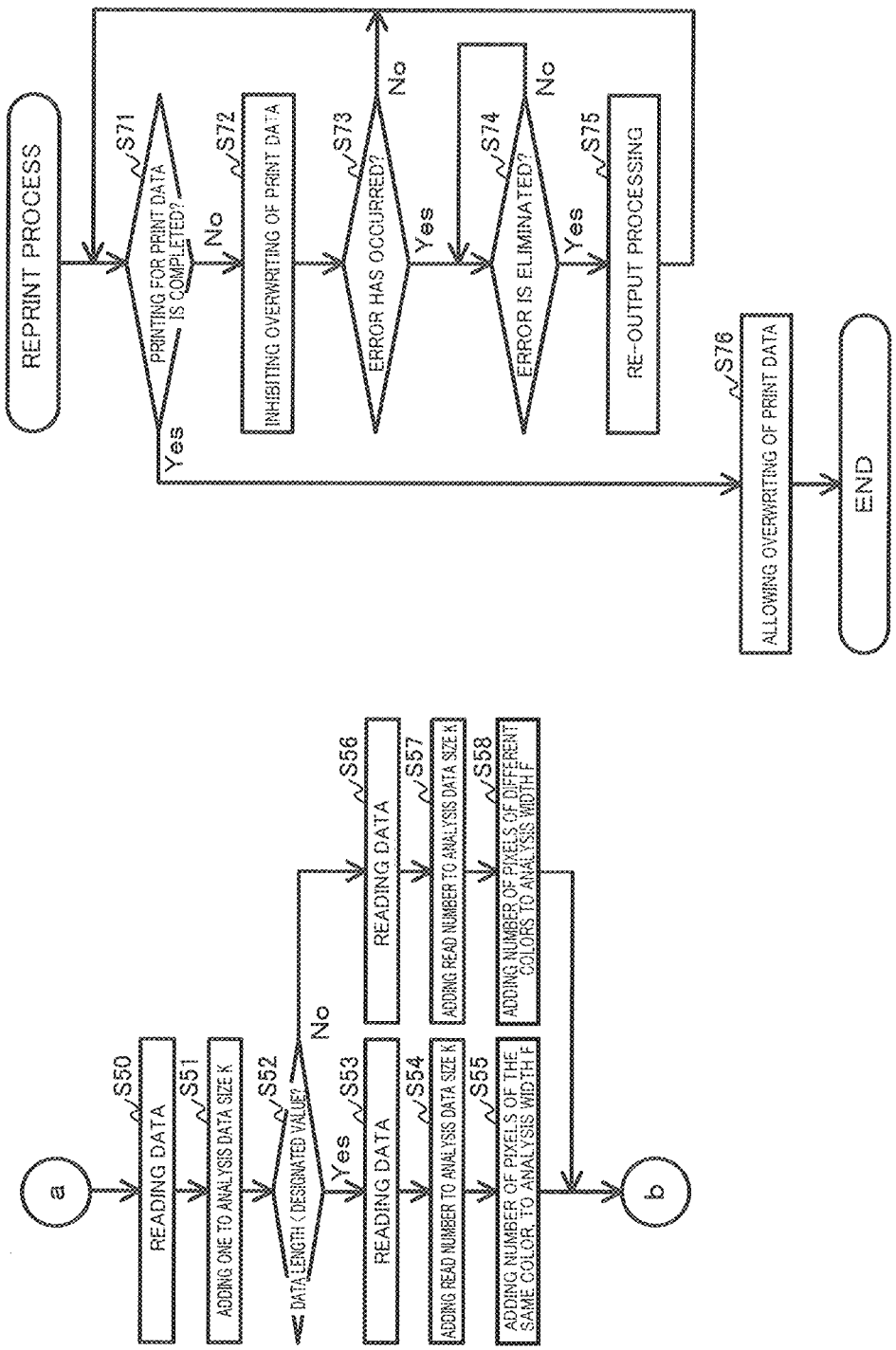
FIG. 4A is a flowchart representing the other portion of the analysis process.
FIG. 4B is a flowchart representing a reprint process.
Figure 5:
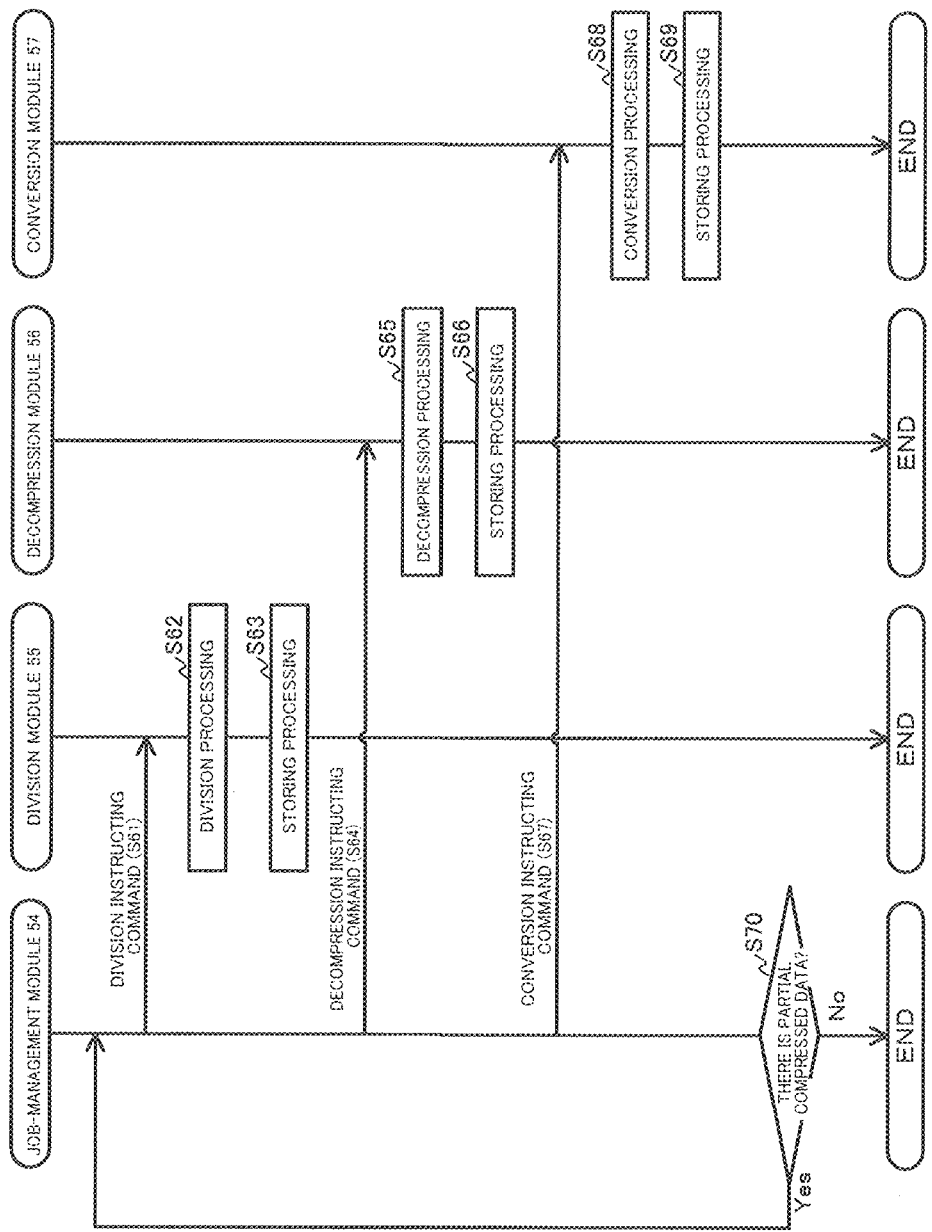

When the analysis module 53 determines that the analysis width F has not reached the width value C (S48: No), as illustrated in FIG. 4A, the analysis module 53 at S50 newly reads unit data having not been analyzed yet. When the unit data is read, the analysis module 53 at S51 adds one to the analysis data size K.

The analysis module 53 at S52 determines whether the data length of the unit data read at S50 is less than a designated value. That is, the analysis module 53 at S52 determines whether the pixels of the same color continue, or the pixels of different colors continue. Specifically, in the case where the unit data is of eight bits, the analysis module 53 determines whether the data length is less than 128 as the designated value. The designated value is stored in the ROM 24 and the EEPROM of the memory 22 in advance.

When the analysis module 53 determines that the data length is less than the designated value, and the pixels of the same color continue (S52: Yes), the analysis module 53 at S53 reads a number of the unit data which is related to the number of pixels of the same color which is indicated by the obtained data length. The analysis module 53 at S54 adds the read number of the unit data to the analysis data size K. The analysis module 53 at S55 adds the number of pixels of the same color which is indicated by the obtained data length, to the analysis width F.

When the analysis module 53 determines that the obtained data length is greater than or equal to the designated value, and the pixels of different colors continue (S52: No), the analysis module 53 at S56 reads a number of the unit data which is related to the number of pixels of different colors which is indicated by the obtained data length. The analysis module 53 at S57 adds the read number of the unit data to the analysis data size K. The analysis module 53 at S58 adds the number of pixels of different colors which is indicated by the obtained data length, to the analysis width F.

After executing the processings at S55 and S58, as illustrated in FIG. 3, the analysis module 53 executes the processings at S46 and subsequent steps again.

After the end of the analysis process (S15), as illustrated in FIG. 2, the analysis module 53 at S16 notifies the job-management module 54 of the analysis data size K stored in the memory 22 at S39, S47, and S49 (FIG. 3) in the analysis process, as the divided-position information. The divided-position information is one example of information indicating the partial compressed data. The processings at S39, S47, and S49 in which the analysis data size K is stored into the memory 22 is one example of a second storing processing.

The job-management module 54 at S17 executes a printing-order determining processing for determining the order of printing of the separate images, based on the model information 28 and the dividing information stored in the memory 22. Specifically, the head 31 (FIG. 1A) prints an image on the sheet while moving in the scanning direction indicated in FIG. 7. Upon the end of the printing in the scanning direction, a line-feed processing is executed to convey the sheet in the conveying direction by a predetermined distance, and then the head 31 moves over the sheet in the scanning direction again to print an image on the sheet. After the compressed image data is rotated, the job-management module 54 determines the order of printing such that the separate image located upstream of the other separate images in the conveying direction is to be printed first. In the example illustrated in FIG. 7, the job-management module 54 determines that printing is to be performed in order of the first separate image, the second separate image, the third separate image, and the fourth separate image. It is noted that the print engine 15 may be any of what is called an on-carriage printer with the head 31 mounted on a carriage, and what is called a line printer in which the head 31 is fixed.

As illustrated in FIG. 2, the job-management module 54 at S18 executes a print-data creating process based on the divided-position information transmitted at S16 and the order of printing determined at S17. The print-data creating process is for creating print data based on the compressed image data. The print-data creating process will be described with reference to FIG. 5. The print-data creating process at S18 is one example of a first creating processing.

The job-management module 54 at S61 inputs a division instructing command to the division module 55. The division instructing command instructs the division module 55 to create the first partial compressed data as the partial compressed data representing the first separate image, by dividing the compressed image data stored in the RAM 25 of the memory 22 and to store the created first partial compressed data into the RAM 25. The division instructing command is attached with (a) the above-described analysis data size K contained in the page information transmitted from the analysis module 53 at S14, and (b) area designating information for designating a storage area of the RAM 25.

In response to receiving the division instructing command at S61, the division module 55 executes a division processing at S62. Specifically, the division module 55 reads the compressed image data from the RAM 25 of the memory 22. The division module 55 uses the analysis data size K to divide the compressed image data into the first partial compressed data and its remaining data. The division module 55 at S63 deletes the remaining data and stores the first partial compressed data into the RAM 25 of the memory 22. The processing at S63 is another example of the second storing processing.

Figure 9A:
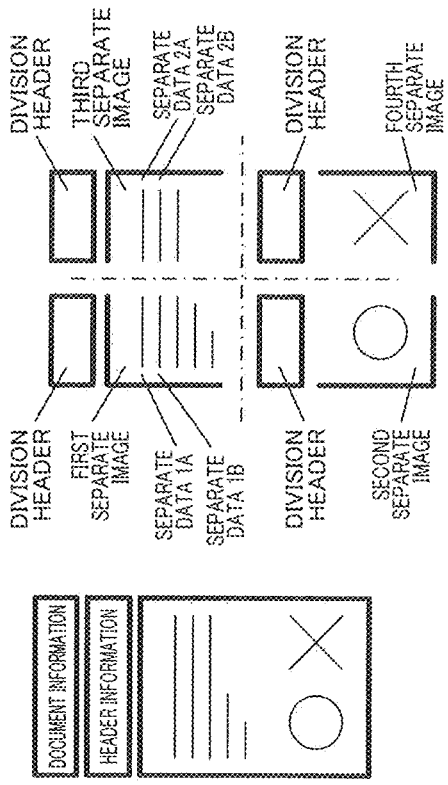
FIG. 9A is a view of configuration of compressed image data.
Figure 9B:
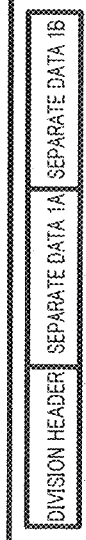
FIG. 9B is a view of data structures of partial compressed data.
Figure 9B:
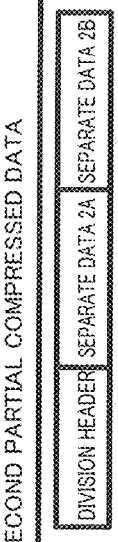
Figure 9C:
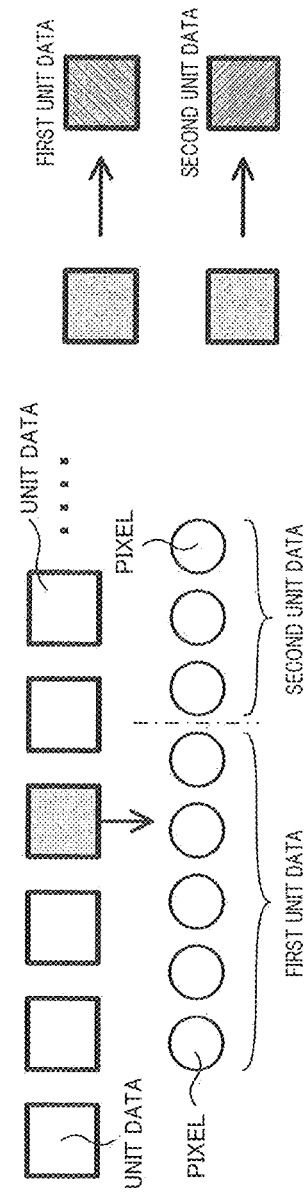
FIG. 9C is a view for explaining creation of first unit data and second unit data.

More specifically, the unit data illustrated in grey in FIG. 9C is represented by the analysis data size K. The unit data represents a plurality of pixels. The image is divided into the first separate image and the second separate image at the dividing position between these pixels. The dividing position is indicated by the one-dot chain line in FIG. 9C.

The division module 55 determines which pixel row is contained in the first separate image between a first pixel row constituted by a plurality of pixels located to the left of the dividing position in FIG. 9C and a second pixel row constituted by a plurality of pixels located to the right of the dividing position in FIG. 9C among the plurality of pixels represented by the unit data indicated by the analysis data size K. The pixel row contained in the first separate image is compressed in the same method as used for the compressed image data to create first unit data. The division module 55 replaces the created first unit data with the unit data illustrated in grey represented by the analysis data size K. As illustrated in FIG. 9B, the division module 55 incorporates separate data 1A and separate data 1B as a plurality of unit data before the first unit data or as the first unit data and a plurality of unit data after the first unit data, into the first partial compressed data. It is noted that, in the case where the second partial compressed data is created, as illustrated in FIG. 9C, second unit data is created in a manner similar to that for the first unit data. The second unit data is unit data containing the pixels for separate images other than the first separate image such as the second separate image and the third separate image. The processing in which the division module 55 determines whether the image is to be divided into the first separate image and the other separate images among the plurality of pixels represented by the unit data indicated by the analysis data size K is one example of a boundary determining processing.

In the case where the division module 55 determines that the image is to be divided into the first separate image and the other separate images in the unit data represented by the analysis data size K, the division module 55 incorporates the unit data to the unit data indicated by the analysis data size K, into the first partial compressed data without creating the first unit data and the second unit data, or incorporates the unit data represented by the analysis data size K and the unit data after the unit data represented by the analysis data size K, into the first partial compressed data.

It is noted that the method of creating the first unit data and the second unit data is one example, and the first unit data and the second unit data may be created in any method.

The division module 55 executes the above-described processing for each of a plurality of dividing positions respectively represented by a plurality of analysis data sizes K contained in dividing-position information to divide the compressed image data into the first separate partial compressed data and its remaining data.

As illustrated in FIG. 9B, the division module 55 creates a division header from the header information in the form of text data. Information representing the created division header is incorporated into the first partial compressed data. It is noted that the created division header is contained in each of all the partial compressed data including the first partial compressed data, the second partial compressed data, the third partial compressed data, and the fourth partial compressed data.

After inputting the division instructing command to the division module 55, the job-management module 54 determines whether the division module 55 has executed the division processing and the storing processing (S63). For example, the job-management module 54 uses polling, for example, to monitor the storage area of the RAM 25 designated by the division instructing command, and when the first partial compressed data is stored into the storage area, the job-management module 54 determines that the division processing and the storing processing have been executed. Alternatively, when a response to the division instructing command is received from the division module 55 having executed the division processing, the job-management module 54 determines that the division processing and the storing processing have been executed.

When the job-management module 54 determines that the division processing and the storing processing have been executed, the job-management module 54 at S64 inputs, to the decompression module 56, a decompression instructing command for instructing decompression. The decompression instructing command is attached with area designating information indicating the storage area of the RAM 25 storing the partial compressed data and a storage area of the RAM 25 for storing first partial decompressed data after decompression.

In response to receiving the decompression instructing command (S64), the decompression module 56 executes a decompression processing at S65. Specifically, the decompression module 56 reads the first partial compressed data from the RAM 25 of the memory 22. The decompression module 56 then creates the first partial decompressed data by decompressing the first partial compressed data read from the RAM 25. The decompression module 56 at S66 stores the first partial decompressed data into the storage area of the RAM 25 which is designated by the job-management module 54.

It is noted that the job-management module 54 may output the decompression instructing command without determining whether the division processing has been executed. In this case, in response to receiving the decompression instructing command, the decompression module 56 uses polling, for example, to monitor whether the first partial compressed data is stored into the RAM 25 of the memory 22, and the decompression module 56 executes the decompression processing (S65) when the first partial compressed data is stored into the RAM 25 of the memory 22.

After inputting the decompression instructing command into the decompression module 56, the job-management module 54 determines whether the decompression module 56 has executed the decompression processing and the storing processing (S66). For example, the job-management module 54 uses polling, for example, to monitor the storage area of the RAM 25 designated by the decompression instructing command, and when the first partial decompressed data is stored into the storage area, the job-management module 54 determines that the decompression module 56 has executed the decompression processing and the storing processing. Alternatively, the job-management module 54 determines that the decompression module 56 has executed the decompression processing and the storing processing, when the job-management module 54 has received a response to the decompression instructing command from the decompression module 56 having executed the decompression processing.

When the job-management module 54 determines that the decompression module 56 has executed the decompression processing and the storing processing, the job-management module 54 at S67 inputs a conversion instructing command to the conversion module 57. The conversion instructing command is attached with area designating information indicating the storage area of the RAM 25 storing the partial decompressed data and a storage area of the RAM 25 for storing the first partial print data.

The conversion instructing command contains an instruction of whether the first separate image represented by the first partial compressed data is to be rotated. The job-management module 54 based on the model information 28 determines whether the first separate image is to be rotated and determines a rotation angle for the case where the first separate image is to be rotated, and the job-management module 54 incorporates the contents of the determination into the instructing command. In the example illustrated in FIG. 7, the conversion module 57 executes a conversion of rotating the first separate image by 90 degrees. The processing in which the job-management module 54 based on the model information 28 determines whether the image is to be rotated is one example of a rotation determination processing. The condition indicated by the model information 28 is one example of a condition of rotation. The processing in which the job-management module 54 determines the rotation angle of the image is one example of a rotation determining processing.

In response to receiving the conversion instructing command (S67), the conversion module 57 executes a conversion processing at S68. Specifically, the conversion module 57 reads the partial decompressed data from the RAM 25 of the memory 22. The conversion module 57 creates the first partial print data by performing conversion, such as the rotation, the color conversion, the error diffusion, and the quinary conversion, to the partial decompressed data read from the RAM 25. The conversion module 57 at S69 stores the created first partial print data, into the storage area of the RAM 25 which is designated by the job-management module 54.

It is noted that the job-management module 54 may output the conversion instructing command without determining whether the decompression processing is executed. In this case, in response to receiving the conversion instructing command, the conversion module 57 uses polling, for example, to monitor whether the partial decompressed data is stored in the RAM 25 of the memory 22, and the conversion module 57 executes the conversion processing (S68) when the partial decompressed data is stored into the RAM 25.

After inputting the conversion instructing command to the conversion module 57, the job-management module 54 determines whether the conversion module 57 has executed the conversion processing and the storing processing (S69). For example, the job-management module 54 uses polling, for example, to monitor the storage area of the RAM 25 designated by the conversion instructing command, and when the first partial print data is stored into the storage area, the job-management module 54 determines that the conversion module 57 has executed the conversion processing and the storing processing. Alternatively, the job-management module 54 determines that the conversion module 57 has executed the conversion processing and the storing processing, when the job-management module 54 has received a response to the conversion instructing command from the conversion module 57 having executed the conversion processing and the storing processing.

In response to determining that the conversion module 57 has executed the conversion processing and the storing processing, the job-management module 54 determines at S70 whether there is the partial compressed data that requires conversion for outputting the print data. Specifically, the head 31 (FIG. 1A) prints an image on the sheet while reciprocating in the scanning direction indicated in FIG. 7. Thus, in order for the head 31 to print an image on the sheet, second partial print data that is partial print data representing the second separate image is required in addition to the first partial print data. The job-management module 54 at S70 determines, based on the model information and the dividing information, whether there is partial compressed data that requires conversion for outputting the print data.

When the job-management module 54 determines that there is partial compressed data that requires conversion for outputting the print data (S70: Yes), the job-management module 54 at S61 inputs, to the division module 55, a division instructing command for creating the partial compressed data that requires conversion for outputting the print data. In the example illustrated in FIG. 7, the division instructing command for dividing the compressed image data to create the second partial compressed data representing the second separate image is input to the division module 55.

In a manner similar to the above-described manner, the division module 55 at S62 divides the compressed image data into the second partial compressed data representing the second separate image and its remaining data, deletes the remaining data, and at S63 stores only the second partial compressed data into the specific storage area of the RAM 25 of the memory 22. The processing at S63 at which the division module 55 stores the second partial compressed data into the specific storage area of the RAM 25 is yet another example of the second storing processing.

In a manner similar to the above-described manner, the job-management module 54 inputs the conversion instructing command into the conversion module 57 and instructs the conversion module 57 to convert second partial decompressed data to create the second partial print data.

When the job-management module 54 at S70 determines that that there is no partial compressed data that requires conversion for outputting the print data (S70: No), the print-data creating process at S18 in FIG. 2 ends. The job-management module 54 at S19 outputs the created first partial print data and second partial print data to the drive circuit 35 and the drive motor 36 of the print engine 15. The processing at S19 in which the job-management module 54 outputs the print data is one example of a first output processing.

Specifically, the job-management module 54 inputs an output instructing command to the print-control module 58. The output instructing command is attached with area designating information indicating the storage area of the RAM 25 storing the first partial print data and the second partial print data.

In response to receiving the output instructing command, the print-control module 58 reads the first partial print data and the second partial print data from the RAM 25 of the memory 22. The print-control module 58 outputs the first partial print data and the second partial print data read from the RAM 25, to the drive circuit 35 and the drive motor 36.

The print engine 15 at S20 prints an image on the sheet based on the first partial print data and the second partial print data input to the drive circuit 35 and the drive motor 36. In the example illustrated in FIG. 7, the first separate image and the second separate image are printed on the sheet.

The job-management module 54 at S21 determines whether there is partial compressed image data representing the separate image having not been converted to the print data. When the job-management module 54 determines that there is partial compressed image data representing the separate image having not been converted to the print data (S21: Yes), the job-management module 54 executes the processings at S18 and S19 again. In the example illustrated in FIG. 7, the job-management module 54 at S18 creates the third partial print data and the fourth partial print data respectively representing the third separate image and the fourth separate image, in a manner similar to the above-described manner and at S19 outputs the created third partial print data and fourth partial print data to the drive circuit 35 and the drive motor 36 of the print engine 15.

The print engine 15 at S20 prints an image on the sheet based on the partial print data input to the drive circuit 35 and the drive motor 36. In the example illustrated in FIG. 7, the print engine 15 prints the third separate image and the fourth separate image on the sheet.

When the job-management module 54 determines that there is no partial compressed image data representing the separate image having not been converted to the print data (S21: No), the job-management module 54 completes the print job at S22, and the process ends.

It is noted that the job-management module 54 may create all the partial print data from the first partial print data to the fourth partial print data and thereafter output them to the print engine 15 as the print data.

Effects

The controller 11 at S62 divides the compressed image data to create the partial compressed data and at S65 decompresses the created partial compressed data to obtain the partial decompressed data. The control program 27 at S68 converts the obtained partial decompressed data to create the partial print data and at S19 outputs the created partial print data. The control program 27 repeats creation and output of the partial print data (S20: Yes) to output all the partial print data. With this configuration, even the printer 10 including the memory 22 not having a capacity enough to convert the entire decompressed image data for one page to the print data can perform printing for the compressed image data. Alternatively, it is possible to reduce the capacity of the RAM 25 of the memory 22 of the printer 10.

The controller 11 creates the partial print data in order of printing determined at S17, making it possible to output the created partial print data and cause the print engine 15 to perform printing without creation of other partial print data. In the example illustrated in FIG. 7, the print engine 15 can perform printing based on the first partial print data and the second partial print data without waiting for input of the third partial print data and the fourth partial print data. This configuration makes it possible to reduce a length of time required for printing when compared with the case where the order of printing is not determined.

The controller 11 determines the order of printing for the image data after execution of the rotation conversion without determining the order of printing for the image data before execution of the rotation conversion. Thus, even in the case where the conversion module 57 executes the rotation conversion, it is possible to reduce the length of time required for printing when compared with the case where the order of printing is not determined.

When the controller 11 determines that the image is to be divided into the first separate image and the other separate images among the plurality of pixels represented by the unit data indicated by the analysis data size K, the controller 11 creates the first unit data representing the pixels contained in the first separate image, based on the unit data indicated by the analysis data size K. The division module 55 replaces the unit data indicated by the analysis data size, with the created first unit data and incorporates the unit data before the first unit data, or the first unit data and the unit data after the first unit data, into the first partial compressed data. When the controller 11 determines that the image is to be divided at the unit data indicated by the analysis data size K, the division module 55 incorporates the unit data before the unit data indicated by the analysis data size K, or the unit data indicated by the analysis data size K and the unit data after the unit data indicated by the analysis data size K, into the first partial compressed data. Accordingly, the controller 11 can divide the compressed image data into the plurality of partial compressed data even in the case where the image is to be divided into the plurality of separate images among the plurality of pixels represented by the unit data indicated by the analysis data size K or even in the case where the image is to be divided into the plurality of separate images at the unit data indicated by the analysis data size K.

First Modification

In the above-described embodiment, the compressed image data is divided by the division module 55 of the job-management module 54. However, the compressed image data may be divided by the analysis module 53. In this case, the division module 55 is not provided in the job-management module 54. After the analysis process at S15 (FIG. 2), the analysis module 53 executes the division processing at S62 (FIG. 4) to store the first partial compressed data, the second partial compressed data, the third partial compressed data, and the fourth partial compressed data into the RAM 25 of the memory 22. Specifically, the analysis module 53 stores the first partial compressed data into a first storage area secured in the RAM 25 by the application 51, stores the second partial compressed data into a second storage area secured in the RAM 25 by the application 51, stores the third partial compressed data into a third storage area secured in the RAM 25 by the application 51, and stores the fourth partial compressed data into a fourth storage area secured in the RAM 25 by the application 51. The job-management module 54 handles the partial compressed data stored in the first storage area as the first partial compressed data, handles the partial compressed data stored in the second storage area as the second partial compressed data, handles the partial compressed data stored in the third storage area as the third partial compressed data, and handles the partial compressed data stored in the fourth storage area as the fourth partial compressed data. That is, based on the storage area storing the partial compressed data, the job-management module 54 determines which separate image the partial compressed data corresponds to. The processing in which the analysis module 53 stores the first partial compressed data into the first storage area, stores the second partial compressed data into the second storage area, stores the third partial compressed data into the third storage area, and stores the fourth partial compressed data into the fourth storage area is yet another example of the second storing processing.

Thus, in the case where the compressed image data is divided into a plurality of partial compressed data in the analysis module 53, the RAM 25 having a capacity enough to store the first partial compressed data, the second partial compressed data, the third partial compressed data, and the four partial compressed data is required. That is, the RAM 25 having a large capacity is required when compared with the above-described embodiment which at least needs the RAM 25 having a capacity enough to individually store each of the first partial compressed data, the second partial compressed data, the third partial compressed data, and the fourth partial compressed data. In the above-described embodiment, however, the controller 11 needs to execute four division processings, i.e., the division processing for creating the first partial compressed data, the division processing for creating the second partial compressed data, the division processing for creating the third partial compressed data, and the division processing for creating the fourth partial compressed data, but in the case where the analysis module 53 divides the compressed image data, it is possible to create all the partial compressed data with one division processing. That is, in the case where the analysis module 53 divides the compressed image data, the RAM 25 having a large capacity is required when compared with the above-described embodiment, but it is possible to further reduce the length of time required for creation of the print data.

Second Modification

As illustrated in FIG. 3, the analysis module 53 at S31 determines whether the data size of the compressed image data is less than a reference value stored in the memory 22. The reference value is a value that is used for determining whether the data size of the partial compressed data is such a large amount that a processing of creating print data from the created partial compressed data cannot be executed even when the partial compressed data is created by dividing the compressed image data, for example. Also, the reference value is a value which is stored in advance in the ROM 24 or the EEPROM of the memory 22 in accordance with the capacity of the RAM 25 of the memory 22. The reference value is one example of a memory threshold value. The processing at S31 is one example of a data-amount determining processing.

When the analysis module 53 determines that the data size of the compressed image data is less than the reference value (S31: Yes), the analysis module 53 executes the processings at S33 and subsequent steps.

When the analysis module 53 determines that the data size of the compressed image data is not less than the reference value (S31: No), the analysis module 53 at S32 reduces the size of an image represented by the compressed image data while decompressing the compressed image data and stores decompressed size-reduced data into the RAM 25 of the memory 22, and the analysis process ends. The size of the compressed image data is reduced by thinning out the pixels representing the image, for example. The reduction ratio is determined in advance and stored in the memory 22 or determined by the analysis module 53 in accordance with the data size of the compressed image data, for example. The processing at S32 is one example of a reduced-size-page-data obtaining processing. The decompressed size-reduced data is one example of reduced-size page data.

Though not indicated by the flowchart in FIG. 2, in the case where the processing at S32 is executed, the job-management module 54 skips the processing at S17 and uses the conversion module 57 at S18 to perform conversion, such as the rotation, the color conversion, the error diffusion, and the quinary conversion, to the size-reduced image data and then enlarge the size-reduced image data to create the print data. The job-management module 54 at S19 outputs the created print data to the print engine 15. The processing in which the job-management module 54 converts and enlarges the size-reduced image data to create the print data is one example of a second creating processing. The processing at S19 in which the job-management module 54 outputs the print data created in the second creating processing is one example of a second output processing.

In the present modification, in the case where the data size of the compressed image data is such a large size that, even when the partial compressed data is created by dividing the compressed image data, the job-management module 54 cannot execute the processing of creating the print data based on the created partial compressed data, it is possible to print images on the respective sheets based on the compressed image data.

It is noted that the processing at S31 may be executed by the job-management module 54. When the job-management module 54 determines that the data amount of the compressed image data is not less than the reference value, the job-management module 54 instructs the division module 55 to execute the processing at S32 instead of transmitting the dividing instruction (S61). The division module 55 creates the decompressed size-reduced data by executing the processing at S32 according to the instruction received from the job-management module 54 and stores the created decompressed size-reduced data into the memory 22.

Third Modification

In the above-described second modification, the processing at S32 is executed to create the decompressed size-reduced data, in the case where the data size of the compressed image data is less than the reference value stored in the memory 22. In the above-described embodiment or the second modification, however, the processing at S32 may be executed in the case where the partial compressed data is created from the compressed image data, and the print data cannot be created from the created partial compressed data. One example of the case where the print data cannot be created is a case where the data amount of the partial compressed data is too large for the capacity of the RAM 25 of the memory 22 to execute the decompression processing and the conversion processing.

Fourth Modification

In the above-described embodiment, the image is divided in the height direction and in the width direction as illustrated in FIG. 7. In the present modification, as illustrated in FIG. 8, the image is to be divided in the scanning direction by way of example. That is, in the above-described embodiment, after creating the first partial print data representing the first separate image, the conversion module 57 creates the second partial print data representing the second separate image to output the first partial print data and the second partial print data together. In the present modification, the partial print data are individually output in order of creation.

Before executing the analysis process (S15), the analysis module 53 determines whether the image is to be rotated, based on the document information contained in the compressed image data and the model information stored in the memory 22. When the analysis module 53 determines that the image is to be rotated, the analysis module 53 determines a dividing direction for the rotated image. When the analysis module 53 determines that the image is not to be rotated, the analysis module 53 determines the dividing direction for the image not to be rotated. The dividing direction coincides with a direction along the scanning direction. In the example illustrated in FIG. 8, the dividing direction coincides with a direction along the longitudinal direction of the sheet.

The analysis module 53 determines the division height threshold value G and the division width threshold value H in the analysis process (S15) based on the determined dividing direction and the number of divisions stored in the memory 22. In the example illustrated in FIG. 8, the analysis module 53 determines not setting the division height threshold value G and sets the division width threshold values H to a value obtained by dividing the width value C by three (C/3) and a value obtained by dividing twice the width value C by three (2C/3). The analysis module 53 executes the analysis process (S15) using the determined division height threshold value G and the division width threshold value H.

The job-management module 54 at S61 inputs the dividing instruction to the division module 55, at S64 inputs the decompression instruction to the decompression module 56, and at S67 inputs the instructing command to the conversion module 57 to create the first partial print data representing the first separate image. As illustrated in FIG. 8, the job-management module 54 outputs the first partial print data representing the first separate image to the print engine 15.

The job-management module 54 at S61 inputs the dividing instruction to the division module 55, at S64 inputs the decompression instruction to the decompression module 56, and at S67 inputs the instructing command to the conversion module 57 to create the second partial print data representing the second separate image. The job-management module 54 outputs the second partial print data representing the second separate image to the print engine 15.

The job-management module 54 at S61 inputs the dividing instruction to the division module 55, at S64 inputs the decompression instruction to the decompression module 56, and at S67 inputs the instructing command to the conversion module 57 to create the third partial print data representing the third separate image. The job-management module 54 outputs the third partial print data representing the third separate image to the print engine 15.

In the present embodiment, the direction along the scanning direction is set as the dividing direction. This configuration enables the job-management module 54 to output the created partial print data individually in order of creation without the need of waiting for output of the first partial print data until creation of the second partial print data as in the above-described embodiment. Accordingly, the length of time required for printing is short when compared with the case where the controller 11 outputs the partial print data after waiting for creation another partial print data.

Fifth Modification

In the present modification, there will be described secure print which requires an input of authentication information for printing of an image.

The compressed image data obtained at S11 by the reception module 52 contains check information indicating whether the authentication information and an input of the authentication information are required. The application 51 determines, based on the check information, whether the compressed image data obtained by the reception module 52 is compressed image data that requires an input of the authentication information. When the application 51 determines that the compressed image data obtained by the reception module 52 is not the compressed image data that requires an input of the authentication information, the job-management module 54 creates the print data in a manner similar to that in the embodiment and outputs the created print data to the print engine 15 to print an image on the sheet.

When the application 51 determines that the compressed image data obtained by the reception module 52 is the compressed image data that requires an input of the authentication information, the job-management module 54 creates the print data in a manner similar to that in the embodiment. The application 51 stores the created print data into the memory 22 and waits for an input of the authentication information. The authentication information is one example of an output instruction. The processing in which the application 51 stores the created print data into the memory 22 and waits for an input of the authentication information is one example of a waiting processing.

One example of the authentication information is a personal identification number (PIN) set by the user. The authentication information is input from the information processing device to the printer 10, for example. Alternatively, the authentication information is directly input to the printer 10 with the touch sensor provided on the display 13 and the operation switch 14.

When the authentication information is input, the application 51 determines whether the input authentication information matches the authentication information contained in the compressed image data. When the application 51 determines that the input authentication information does not match the authentication information contained in the compressed image data, the application 51 controls the display 13 to display an image indicating that the input authentication information does not match the authentication information contained in the compressed image data, or transmits the image to the information processing device via the communication interface 12.

When the application 51 determines that the input authentication information matches the authentication information contained in the compressed image data, the application 51 instructs the job-management module 54 to output the print data stored in the memory 22, to the print engine 15.

The printer 10 according to the present modification is capable of printing images on the respective sheets based on the compressed image data even in the secure print.

It is noted that the secure print is described in the present modification as one example of saving printing. However, the saving printing may be any printing as long as the printing requires an input of the output instruction such as the authentication information.

Sixth Modification

In the present modification, there will be described an example in which the control program 27 executes a reprint process illustrated in FIG. 4B. The reprint process is a process in which, in the event of a jam of a sheet in the print engine 15, the control program 27 outputs the print data to the print engine 15 again to print, on a new sheet, an image planned to be printed on the jammed sheet.

After outputting the print data to the print engine 15 at S19 (FIG. 2), the job-management module 54 at S71 determines whether an image represented by the output print data is printed on the sheet. For example, the job-management module 54 calculates a rotation amount of the conveying roller 33 using a detection signal input from a rotary encoder provided on the conveying roller 33, and when a conveyance amount of the sheet which is indicated by the calculated rotation amount of the conveying roller 33 has reached the length of the image represented by the print data in the conveying direction, the job-management module 54 determines that the image represented by the output print data has been printed on the sheet (S71: Yes). It is noted that the job-management module 54 may execute this determination in any method as long as the job-management module 54 can determine whether the image represented by the output print data has been printed on the sheet. The processing at S71 is one example of an end determining processing.

When the job-management module 54 determines that the image represented by the output print data has been printed on the sheet (S71: Yes), the job-management module 54 at S76 allows overwriting of the output print data stored in the memory 22, and the reprint process ends.

When the job-management module 54 determines that the print engine 15 is printing the image represented by the output print data (S71: No), the job-management module 54 at S72 inhibits overwriting of the output print data stored in the memory 22. That is, the print data output to the print engine 15 is not overwritten in the memory 22 until the image represented by the print data is printed on the sheet.

The job-management module 54 at S73 determines whether an error has occurred. For example, the job-management module 54 determines that an error due to a jam of the sheet has occurred, when the conveyance amount of the sheet which is indicated by the calculated rotation amount of the conveying roller 33 is not equal to the conveyance amount to be indicated by the print data. Alternatively, the job-management module 54 determines that the error has occurred, when a predetermined detection signal is input from a sensor. Examples of the sensor include: an open/close sensor configured to detect opening and/or closing a cover covering the print engine 15; an installation/removal sensor configured to detect installation and/or removal of the sheet-supply tray; and a sheet sensor configured to detect the sheet being conveyed. The value of a signal output from the open/close sensor changes with opening and closing of the cover. The value of a signal output from the installation/removal sensor changes so as to be different between the case where the sheet-supply tray is installed in the printer 10 and the case where the sheet-supply tray is removed from the printer 10. The value of a signal output from the sheet sensor changes so as to be different between the case where the sheet is being conveyed and the case where the sheet is not being conveyed. The job-management module 54 determines that an error due to impossible continuation of printing has occurred when the job-management module 54, based on a change of the signal input from the sensor, determines that the closed cover is opened, that the installed sheet-supply tray is removed from the printer 10, or that there is no sheet on the sheet-supply tray, and no sheet is being conveyed. It is noted that the error is not limited to the above-described examples and may be any error as long as printing cannot be continued.

While the print engine 15 is performing printing based on the print data (S71: No), the job-management module 54 monitors an occurrence of the error (S73: No).

When the job-management module 54 determines that the error has occurred (S73: Yes), the job-management module 54 at S74 determines whether the error is eliminated. For example, the job-management module 54 determines that the error is eliminated, when the user closes the cover after opening the cover and removing the jammed sheet from the print engine 15. Specifically, the job-management module 54 determines that the error is eliminated (S74: Yes), when the job-management module 54 has detected closing of the cover based on a change of the signal output from the open/close sensor after detecting opening of the cover based on a change of the signal output from the open/close sensor.

In another case, the job-management module 54 determines that the error is eliminated, when the user has installed the sheet-supply tray in the printer 10 after removing the sheet-supply tray from the printer 10 and replenishing the sheet-supply tray with new sheets. Specifically, the job-management module 54 determines that the error is eliminated (S74: Yes), when the job-management module 54 has detected installation of the sheet-supply tray in the printer 10 based on a change of the signal output from the installation/removal sensor after detecting removal of the sheet-supply tray from the printer based on a change of the signal output from the installation/removal sensor.

In yet another case, the job-management module 54 determines that the error is eliminated (S74: Yes), when the job-management module 54 has received an input of an instruction indicating a restart of the printing, using the touch sensor of the display 13 and/or the operation switch 14. Each of the signal output from the sensor and indicating the error is eliminated, and an instruction indicating the restart of the printing is one example of a restart enabling input. The processing at S74 in which the job-management module 54 receives the signal output from the sensor and indicating the error is eliminated or the instruction indicating the restart of the printing is one example of a restart-enabling-input receiving processing.

The job-management module 54 executes the processing at S74 until the error is eliminated (S74: No). When the job-management module 54 determines that the error is eliminated (S74: Yes), the job-management module 54 executes a re-output processing at S75. The re-output processing is a processing for outputting the print data stored in the memory 22, to the print engine 15 again.

After executing the re-output processing (S75), the job-management module 54 executes the processings at S71 and subsequent steps again.

It is noted that the job-management module 54 may at S72 inhibit overwriting of all the partial print data for one page and may at S72 inhibit overwriting of only the partial print data for which printing has not been completed yet. The job-management module 54 in the re-output processing (S75) executes the division processing, the decompression processing, and the conversion processing again for the partial print data output before the partial print data for which printing has not been completed yet, to create the partial print data.

In the present modification, in the case where an error has occurred such as a jamming of the sheet and no sheet for printing, it is possible to output at least one partial print data to the print engine 15 in the re-output processing without executing the division processing, the decompression processing, and the conversion processing again. Accordingly, the length of time required for printing is reduced in the re-output processing when compared with the case where all the partial print data are created again.

OTHER MODIFICATIONS

In the above-described embodiment, the compressed image data for one page is input to the printer 10. However, compressed image data for a plurality of pages may be input to the printer 10. In this case, the analysis module 53 in the analysis process (S15) stores the analysis data size K identifying the unit data representing the end of the page, into the memory 22, in addition to the analysis data size K identifying the unit data representing the dividing position. Before executing the division processing, the division module 55 divides the compressed image data into page partial compressed data each as compressed data for a corresponding one of the pages. The division module 55 executes the division processing for the page partial compressed data. Accordingly, even in the case where the compressed image data containing the plurality of pages are input, the controller 11 can create the print data based on the input compressed image data and cause the print engine 15 to print images.

In the above-described embodiment, the controller 11 may execute a processing of increasing the number of divisions in the case where the controller 11 creates the partial compressed data based on the compressed image data and cannot create the print data based on the created partial compressed data. For example, in the case where the print data cannot be created by three-portion division illustrated in FIG. 8, the controller 11 changes the number of divisions to four or five, for example. Accordingly, even in the case where the capacity of the RAM 25 of the memory 22 is not enough for the three-portion division, and the partial print data cannot be created by decompressing and converting the partial compressed data, for example, the controller 11 can increase the number of divisions to create the print data and perform printing therefor.

What is claimed is:
1. A printing apparatus, comprising:
a memory; and
a controller configured to execute:
  a receiving processing in which the controller receives compressed image data as compressed data;

a first storing processing in which the controller stores the compressed image data into the memory;

an identifying processing in which the controller individually identifies a plurality of partial compressed data in the compressed image data stored in the memory, the plurality of partial compressed data corresponding respectively to a plurality of separate images obtained by dividing an image corresponding to one page, the controller being configured to obtain from the compressed image data, at least one of (i) a height value representing the number of pixels of the image corresponding to the one page in a height direction and (ii) a width value representing the number of pixels of the image corresponding to the one page in a width direction, the controller being configured to determine at least one of (a) a division height position, based on the obtained height value, representing a dividing position in the compressed image data at which the compressed image data are divided in the height direction and (b) a division width position, based on the obtained width value, representing a dividing position in the compressed image data at which the compressed image data are divided in the width direction;

a second storing processing in which the controller stores each of the plurality of partial compressed data into the memory or stores information identifying each of the plurality of partial compressed data, into the memory, the compressed image data being divided into the plurality of partial compressed data by the at least one of (a) the division height position and (b) the division width position;

a first creating processing in which the controller decompresses one partial compressed data of the plurality of partial compressed data and creates print data based on partial decompressed data obtained by decompressing the one partial compressed data; and a first output processing in which the controller outputs the created print data, the controller being configured to repeat the first creating processing and the first output processing a number of times corresponding to the number of the plurality of partial compressed data, the printing apparatus being configured to perform printing based on the print data output in the first output processing.

2. The printing apparatus according to claim 1, further comprising a printing unit configured to convey a sheet and print an image on the conveyed sheet from an upstream side toward a downstream side in a sheet conveying direction in which the sheet is conveyed, wherein the controller is configured to, in the first creating processing:

determine an order of printing of the plurality of separate images that are to be printed in order from the upstream side toward the downstream side in the sheet conveying direction; and decompress the plurality of partial compressed data in the determined order of printing.

3. The printing apparatus according to claim 2, wherein the controller is configured to, in the identifying processing, identify the plurality of partial compressed data respectively representing the plurality of separate images created by dividing the image corresponding to the one page along a direction orthogonal to the sheet conveying direction, wherein the order of printing is an order of arrangement of the plurality of separate images from the upstream side toward the downstream side in the sheet conveying direction, and wherein the controller is configured to, in the first creating processing, decompress the partial compressed data in the order of printing.

4. The printing apparatus according to claim 1, wherein the controller is configured to:

create a plurality of storage areas in the memory, the plurality of storage areas corresponding to the number of the plurality of partial compressed data corresponding respectively to the plurality of separate images obtained by dividing the image; and store the one partial compressed data into one of the plurality of storage areas, and wherein the plurality of storage areas are created corresponding respectively to positions of the plurality of separate images respectively represented by the plurality of partial compressed data.

5. The printing apparatus according to claim 1, wherein the compressed image data comprises header information, and wherein the controller is configured to, in the identifying processing, identify (i) first partial compressed data containing (a) partial compressed data representing a first separate image among the plurality of partial compressed data and (b) division header information created from the header information, and (ii) second partial compressed data containing (c) partial compressed data representing a second separate image among the plurality of partial compressed data and (d) the division header information created from the header information.

6. The printing apparatus according to claim 5, wherein the header information comprises at least one of a print setting and a resolution of the image corresponding to one page.

7. The printing apparatus according to claim 6, wherein the controller is configured to, in the first creating processing:

create print data corresponding to the first separate image, based on the first partial compressed data; and create print data corresponding to the second separate image, based on the second partial compressed data.

8. The printing apparatus according to claim 1, wherein the controller is configured to execute the second storing processing, the first creating processing, and the first output processing when the partial compressed data has been identified in a first identifying processing as the identifying processing, wherein the controller is configured to execute, when the partial compressed data has not been identified in the first identifying processing:

a reduced-size-page-data obtaining processing in which the controller reduces a size of the compressed image data while decompressing the compressed image data and obtains reduced-size page data that is size-reduced image data for one page;

a second creating processing in which the controller creates print data based on the reduced-size page data; and a second output processing in which the controller outputs the print data created in the second creating processing.

9. The printing apparatus according to claim 1,
wherein the controller is configured to execute a data-amount determining processing in which the controller determines whether a data amount of the compressed image data exceeds a memory threshold value stored in the memory,
wherein the controller is configured to execute the first storing processing, the identifying processing, the second storing processing, the first creating processing, and the first output processing when the controller determines that the data amount does not exceed the memory threshold value, and
wherein the controller is configured to execute, when the controller determines that the data amount exceeds the memory threshold value:
- a reduced-size-page-data obtaining processing in which the controller reduces a size of the compressed image data while decompressing the compressed image data and obtains reduced-size page data that is size-reduced image data for one page;
- a second creating processing in which the controller creates print data based on the reduced-size page data; and
- a second output processing in which the controller outputs the print data created in the second creating processing.

10. The printing apparatus according to claim 9, wherein the memory threshold value is stored in the memory as a condition of execution of the first storing processing, the identifying processing, the second storing processing, the first creating processing, and the first output processing.

11. The printing apparatus according to claim 1, further comprising a display and a user interface,
wherein the controller is configured to execute:
- a waiting processing in which when the controller determines that the compressed image data is compressed image data for saving printing that requires an input of an output instruction, the controller stores the print data created in the first creating processing into the memory to wait for the output instruction; and
- the first output processing in which when the input of the output instruction is received via the user interface, the controller outputs the print data that is stored in the memory to wait for the output instruction.

12. The printing apparatus according to claim 1,
wherein the controller is configured to execute:
an end determining processing in which the controller determines whether printing for the print data output in the first output processing is finished; and
a restart-enabling-input receiving processing in which the controller receives a restart enabling input that enables a restart of the printing, and
wherein the controller is configured to:
when the controller determines in the end determining processing that printing for one print data output in the first output processing is not finished, keep the one print data in the memory; and
when the restart enabling input is received, execute the first output processing again.

13. The printing apparatus according to claim 1,
wherein the controller comprises:
a computer; and
an application, a reception module, an analysis module, and a job-management module executable by the computer,
wherein the reception module is configured to cause the computer to execute:
the receiving processing in which the computer receives an instruction from the application and receives the compressed image data; and
the first storing processing in which the computer stores the received compressed image data, into a storage area of the memory which is instructed by the application,
wherein the analysis module is configured to cause the computer to execute the identifying processing in which the computer receives an instruction from the application and identifies the partial compressed data by reading and analyzing the compressed image data for one page stored in the storage area of the memory which is instructed by the application,
wherein one of the analysis module and the job-management module is configured to cause the computer to execute the second storing processing in which the computer receives an instruction from the application, divides the compressed image data for one page into the plurality of partial compressed data, and stores a portion of the plurality of partial compressed data into the storage area of the memory which is instructed by the application, and
wherein the job-management module is configured to cause the computer to repeat (i) the first creating processing in which the computer receives an instruction from the application, reads the partial compressed data from the memory, and creates the print data by decompressing the read partial compressed data and (ii) the first output processing a number of times corresponding to the number of the plurality of partial compressed data.

14. A module provided in a controller of a printing apparatus comprising a memory and the controller,
the controller being configured to execute:
a receiving processing in which the controller receives compressed image data as compressed data;
a first storing processing in which the controller stores the compressed image data into the memory;
an identifying processing in which the controller individually identifies a plurality of partial compressed data in the compressed image data stored in the memory, the plurality of partial compressed data corresponding respectively to a plurality of separate images obtained by dividing an image corresponding to one page, the controller being configured to obtain from the compressed image data, at least one of (i) a height value representing the number of pixels of the image corresponding to the one page in a height direction and (ii) a width value representing the number of pixels of the image corresponding to the one page in a width direction, the controller being configured to determine at least one of (a) a division height position, based on the obtained height value, representing a dividing position in the compressed image data at which the compressed image data are divided in the height direction and (b) a division width position, based on the obtained width value, representing a dividing position in the compressed image data at which the compressed image data are divided in the width direction;
a second storing processing in which the controller stores each of the plurality of partial compressed data into the memory or stores information identifying each of the plurality of partial compressed data, into the memory, the compressed image data being divided into the plurality of partial compressed data by the at least one of (a) the division height position and (b) the division width position;
a creating processing in which the controller decompresses one partial compressed data of the plurality of partial compressed data and creates print data based on partial decompressed data obtained by decompressing the one partial compressed data; and
an output processing in which the controller outputs the created print data,
the controller being configured to repeat the creating processing and the output processing a number of times corresponding to the number of the plurality of partial compressed data, and execute the identifying processing.

15. A printing apparatus, comprising:
a memory; and
a controller configured to execute:
   a receiving processing in which the controller receives compressed image data as compressed data;
   a first storing processing in which the controller stores the compressed image data into the memory;
   an identifying processing in which the controller individually identifies a plurality of partial compressed data in the compressed image data stored in the memory, the plurality of partial compressed data corresponding respectively to a plurality of separate images obtained by dividing an image corresponding to one page;
   a second storing processing in which the controller stores each of the plurality of partial compressed data into the memory or stores information identifying each of the plurality of partial compressed data, into the memory;
   a first creating processing in which the controller decompresses one partial compressed data of the plurality of partial compressed data and creates print data based on partial decompressed data obtained by decompressing the one partial compressed data; and
   a first output processing in which the controller outputs the created print data,
the controller being configured to repeat the first creating processing and the first output processing a number of times corresponding to the number of the plurality of partial compressed data,
the printing apparatus being configured to perform printing based on the print data output in the first output processing,
wherein the printing apparatus further comprises a printing unit configured to convey a sheet and print an image on the conveyed sheet from an upstream side toward a downstream side in a sheet conveying direction in which the sheet is conveyed,
wherein the controller is configured to, in the first creating processing:
   determine an order of printing of the plurality of separate images that are to be printed in order from the upstream side toward the downstream side in the sheet conveying direction; and
   decompress the plurality of partial compressed data in the determined order of printing,
wherein the controller is configured to execute:
   a rotation determination processing in which the controller determines whether a condition for rotating the image corresponding to the one page is satisfied; and
   a rotation-angle determination processing in which the controller determines a rotation angle when the controller determines that the condition for rotating the image corresponding to the one page is satisfied, and
wherein the controller is configured to, in the first creating processing:
   determine the order of printing in the case where the image corresponding to the one page is rotated by the determined rotation angle; and
   decompress the partial compressed data in the order of printing.

16. A printing apparatus, comprising:
a memory; and
a controller configured to execute:
   a receiving processing in which the controller receives compressed image data as compressed data;
   a first storing processing in which the controller stores the compressed image data into the memory;
   an identifying processing in which the controller individually identifies a plurality of partial compressed data in the compressed image data stored in the memory, the plurality of partial compressed data corresponding respectively to a plurality of separate images obtained by dividing an image corresponding to one page;
   a second storing processing in which the controller stores each of the plurality of partial compressed data into the memory or stores information identifying each of the plurality of partial compressed data, into the memory;
   a first creating processing in which the controller decompresses one partial compressed data of the plurality of partial compressed data and creates print data based on partial decompressed data obtained by decompressing the one partial compressed data; and
   a first output processing in which the controller outputs the created print data,
the controller being configured to repeat the first creating processing and the first output processing a number of times corresponding to the number of the plurality of partial compressed data,
the printing apparatus being configured to perform printing based on the print data output in the first output processing,
wherein the compressed image data comprises a plurality of unit data,
wherein each of the plurality of unit data represents one pixel or a plurality of pixels,
wherein the controller is configured to execute:
   an obtaining processing in which the controller obtains, from the compressed image data, at least one of (i) a height value representing the number of pixels of the image corresponding to the one page in a height direction and (ii) a width value representing the number of pixels of the image corresponding to the one page in a width direction; and
   a threshold-value determining processing in which the controller determines at least one of (a) a division height threshold value representing a dividing position that is a position in an image represented by the compressed image data in the height direction based on the obtained height value and (b) a division width threshold value representing a dividing position that is a position in the image corresponding to the one page in the width direction based on the obtained width value, wherein the controller is configured to, in the identifying processing:
- obtain a pixel count value by counting the one pixel or the plurality of pixels represented by each of the plurality of unit data contained in the compressed image data; and
- identify, as dividing-position unit data, the unit data that is the unit data at a time when a width indicated by the pixel count value has reached the division width threshold value or the unit data that is the unit data at a time when a height indicated by the pixel count value has reached the division height threshold value, and wherein the controller is configured to:
- set the unit data before the identified dividing-position unit data to unit data belonging to one partial compressed data of the plurality of partial compressed data; and
- set the unit data after the identified dividing-position unit data to unit data belonging to another partial compressed data of the plurality of partial compressed data.

17. The printing apparatus according to claim 16, wherein the controller is configured to:
- in the obtaining processing, obtain document information contained in the compressed image data to determine and obtain one of the height value and the width value based on the obtained document information; and
- in the threshold-value determining processing, determine the number of divisions in the height direction and the number of divisions in the width direction, determine the division height threshold value by dividing the height value by the determined number of divisions, and determine the division width threshold value by dividing the width value by the determined number of divisions.

18. The printing apparatus according to claim 16,
wherein the controller is configured to execute a boundary determining processing in which the controller determines whether the image represented by the compressed image data is to be divided at a position in the plurality of pixels represented by the dividing-position unit data, and wherein the controller is configured to, in the identifying processing:
- when the controller determines that the image represented by the compressed image data is not to be divided at the position in the plurality of pixels represented by the dividing-position unit data, set the dividing-position unit data to unit data belonging to the one partial compressed data; and
- when the controller determines that the image represented by the compressed image data is to be divided at the position in the plurality of pixels represented by the dividing-position unit data, divide the dividing-position unit data into (i) first unit data representing one of pixel rows to be divided and (ii) second unit data representing the other of the pixel rows to be divided, set the first unit data to the unit data belonging to the one partial compressed data, and set the second unit data to the unit data belonging to said another partial compressed data.

* * * * *